(12) United States Patent
Forde et al.

(10) Patent No.: US 10,021,735 B2
(45) Date of Patent: Jul. 10, 2018

(54) VIRAL MOLECULAR NETWORK ARCHITECTURE AND DESIGN

(71) Applicant: ATTOBAHN, INC., Ashburn, VA (US)

(72) Inventors: Richard A. Forde, Ashburn, VA (US); Darryl L. Gray, Fairfax, VA (US)

( * ) Notice: Subject to any disclaimer, the term of this patent is extended or adjusted under 35 U.S.C. 154(b) by 0 days.

(21) Appl. No.: 14/895,652

(22) PCT Filed: Jun. 4, 2014

(86) PCT No.: PCT/US2014/040933
§ 371 (c)(1),
(2) Date: Dec. 3, 2015

(87) PCT Pub. No.: WO2014/197613
PCT Pub. Date: Dec. 11, 2014

(65) Prior Publication Data
US 2016/0128135 A1    May 5, 2016

Related U.S. Application Data

(60) Provisional application No. 61/830,701, filed on Jun. 4, 2013.

(51) Int. Cl.
*H04W 84/00* (2009.01)
*H04B 1/3888* (2015.01)

(52) U.S. Cl.
CPC ........ *H04W 84/005* (2013.01); *H04B 1/3888* (2013.01)

(58) Field of Classification Search
CPC .. H04B 1/3888; H04W 84/005; H04W 74/04; H04J 2203/0091

USPC .......................................................... 370/345
See application file for complete search history.

(56) References Cited

U.S. PATENT DOCUMENTS

| | | | | |
|---|---|---|---|---|
| 5,917,815 A | | 6/1999 | Byers et al. | |
| 6,005,865 A | * | 12/1999 | Lewis ................. | H04L 12/6418 370/398 |
| 6,621,830 B1 | * | 9/2003 | Semple ............... | H04L 49/3081 370/468 |
| 6,778,503 B1 | * | 8/2004 | Sproat ................. | H04J 3/12 370/247 |
| 6,954,461 B1 | * | 10/2005 | Tomlins ............. | H04L 12/5601 370/395.5 |
| 7,075,952 B1 | * | 7/2006 | Torma ................. | H04J 3/1623 370/468 |
| 7,242,686 B1 | * | 7/2007 | Dougherty .......... | H04L 12/5601 370/395.4 |
| 2002/0049047 A1 | | 4/2002 | Elder et al. | |
| 2002/0075854 A1 | * | 6/2002 | Kumar ............... | H04Q 11/0005 370/352 |
| 2003/0147379 A1 | * | 8/2003 | Elias ..................... | H04J 3/1617 370/352 |
| 2004/0229621 A1 | | 11/2004 | Misra | |
| 2004/0235491 A1 | | 11/2004 | Lundstrom et al. | |
| 2005/0030982 A1 | * | 2/2005 | Eshraghian ......... | H04L 12/5601 370/545 |

(Continued)

*Primary Examiner* — Robert Lopata

(57) ABSTRACT

The present disclosure relates to a wireless communication device, a high speed, high capacity dedicated mobile network system, and a method for transmitting information streams across a molecular network to end users without using IEEE 802 LAN, ATM or TCP/IP connection-oriented standards and protocols.

8 Claims, 22 Drawing Sheets

(56) References Cited

U.S. PATENT DOCUMENTS

| | | | |
|---|---|---|---|
| 2005/0068992 A1 | 3/2005 | Kaku et al. | |
| 2006/0262888 A1* | 11/2006 | Mathew | G06F 1/04 375/355 |
| 2006/0268832 A1* | 11/2006 | Mekala | H04J 3/14 370/352 |
| 2006/0268888 A1* | 11/2006 | Liu | H04L 12/5601 370/395.1 |
| 2007/0002889 A1 | 1/2007 | Sekhar | |
| 2007/0241200 A1 | 10/2007 | Sawachi | |
| 2008/0037581 A1* | 2/2008 | Asano | H04J 3/1611 370/466 |
| 2008/0298806 A1* | 12/2008 | Effenberger | H04J 14/0226 398/75 |
| 2010/0290783 A1* | 11/2010 | Kazawa | H04Q 11/0067 398/66 |
| 2012/0315031 A1* | 12/2012 | Zhong | H04B 10/032 398/8 |
| 2013/0028264 A1* | 1/2013 | Munoz | H04L 12/5601 370/395.64 |
| 2013/0266029 A1* | 10/2013 | Yi | H04J 3/1652 370/535 |
| 2013/0287017 A1* | 10/2013 | Chen | H04L 49/253 370/355 |
| 2014/0219132 A1* | 8/2014 | Delveaux | H04L 41/082 370/254 |
| 2015/0146730 A1* | 5/2015 | Desai | H04L 12/4625 370/392 |

* cited by examiner

ATTOBahn SYSTEM INTERCONNECT (ASI)

INTERNET SYSTEM INTERCONNECT

VIRAL MOLECULAR NETWORK ARCHITECTURE AND DESIGN

RELATED APPLICATIONS

The present patent application is related to and claims the priority benefit of U.S. Provisional Patent Application Ser. No. 61/830,701, filed Jun. 4, 2013, the content of which is hereby incorporated by reference in its entirety into this disclosure.

TECHNICAL FIELD

The present disclosure is directed to broadband wireless mobile network communications. More particularly, the present disclosure is directed to a Viral Molecular Network that is a high speed, high capacity terabits per second (Tbps) wireless network that has an adoptive mobile backbone and access levels.

BACKGROUND

The current Internet worldwide network is based on technologies developed more than a quarter century ago. The primary part of these technologies is the Internet Protocol-Transmission Control Protocol/Internet Protocol (TCP/IP) transport router systems that functions as the integration level for data, voice, and video. The problem that has plagued the Internet is its inability to properly accommodate voice and video with the high quality performance that these two applications require in order for human interaction. The varying length packet sizes, long router nodal delays, and dynamic unpredictable transport routes of IP routers result in extended and varying latency. This unpredictability, prolonged and unsteady latency has a negative effect on voice and video applications, such as poor quality voice conversations and the famous "buffer" wheel as the end user wait on the video clip or movie to download. In addition to the irritating choppy voice calls, interruption of videos and movies as they play, and the jerking movement of pictures during video conferencing, these problems are compounded with the narrowband architecture of IP to move the new 4K/5K ultra high definition television signals, studio quality real-time news reporting and real-time 3D Ultra High Definition video/interactive stadium sporting (NFL, NBA, MLB, NHL, soccer, cricket, athletics events, tennis, etc.) environments. Also high resolution graphics and corporate mission critical applications suffer the same fate as the aforementioned services and applications when traversing the Internet TCP/IP network. The deficiencies of IP routing on these very popular applications have resulted in a worldwide Internet that delivers inconsistent service qualities for both consumers and businesses. The existing Internet network can be categorized as a low quality consumer network that was originally designed for narrow band data and not to carry high capacity voice, video, interactive video conferencing, real-time TV news reporting and streaming video, high capacity mission critical corporate operational data, or high resolution graphics in a dynamic environment. The Internet infrastructure worldwide has evolved from the major industrial nations to small developing countries with a litany of network performance inconsistency and a multiplicity of quality issues.

The hardware and software manufacturers of IP based networks has cobbled together a series of mismatch hardware and technologies over the years as the miniaturizing computing world of devices rapidly migrated to the billions of human masses, resulting in an expeditious immigration of wireless devices to accommodate the great mobility of mankind and their way of interacting with their newly technological experience.

All of the aforementioned dynamics of the technological world, plus the economies of scale and scope that computing processing and memory have afforded; the layering and simplicity of software coding have created the new world of apps that used to be controlled and constricted under Microsoft, whereby literally tens of thousands of these apps are developed every year; and the vast array of consumer computing devices and uses have resulted in the worldwide hunger for bandwidth and speed beyond light range. While this category five (5) tornado like, consumer technological revolution decimates the worldwide Internet, the Local Exchange Carriers (LECs), Inter-Exchange Carriers (IXCs), International Carriers (ICs), Internet Services Providers (ISPs), Cable Providers, and network hardware manufacturers are scrambling to develop band aid solutions such as Long Term Evolution (LTE) cell telephone based networks and IP networking hardware respectively, to squelch the 250 miles per hour masses technological tornado.

The current Internet communications networks transport voice, data, and video in TCP/IP packets which are encapsulated in Local Area Network layer two MAC frames and then placed into frame relay or Asynchronous Transfer Mode (ATM) protocol to traverse the wide area network. These series of standard protocols add a tremendous amount of overhead to the original data information. This type of network architecture creates inefficiencies which result in poor network performance of wide bandwidth video and multimedia applications. It is these highly inefficient protocols that dominate the Internet, Inter-Exchange Carriers (IXC), Local Exchange Carriers (LEC), Internet Service Providers (ISP), and Cloud based service provider network architectures and infrastructures. The net effect is an Internet that cannot meet the demands of the voice, video and the new high capacity applications and advancement in 4K/5K ultra high definition TV with high quality performance.

In the past, others have attempted to address the Internet performance problems by enhancing the TCP/IP, IEEE 802 LAN, ATM and TCP/IP heavily-layered standards and utilizing additional protocols with the adoption of Voice Over IP, video transport, and streaming video using a patch work of protocols such Real Time Protocol (RTP), Real Time Streaming Protocol (RTSP), and Real Time Control Protocol (RTCP) running over IP. Some developers and network architects designed various approaches to address more narrow solutions such as U.S. Pat. No. 5,440,551 discloses a multimedia packet communication system for use with an ATM network wherein connections could be selectively used automatically and dynamically in accordance with qualities required by an application, in which a plurality of communications of different required qualities are involved to set quality classes. However, the use of the ATM standard cell frame format and connection-oriented protocol does not alleviate the issues of the heavily, -layered standard.

Additionally, U.S. Pat. No. 7,376,713 discloses a system, apparatus and method for transmitting data on a private network in blocks of data without using TCP/IP as a protocol by dividing the data into a plurality of packets and use of a MAC header. The data is stored in contiguous sectors of a storage device to ensure that almost every packet will either contain data from a block of sectors or is a receipt acknowledgment of such packet. Again, the use of the variable length data blocks, a MAC header and an acknowledgment receipt through a connection-oriented protocol, even in a dedicated or private network does not fully alleviate the buffering and queuing delays of the IEEE 802 LAN, ATM, and TCP/IP standards and protocols because of the higher layering.

More recently, US Patent Publication No. 2013/0051398 A1 discloses a low-load and high-speed control switching node which does not incorporate a central processing unit (CPU) and is for use with an external control server. The described framing format is limited to two layers to accommodate varying size data packets. However, the use of variable length framing format and the partial use of TCP/IP stack to move the data and matching the MAC addressing schema does not alleviate use of these conventional and heavily-layered protocols in the switching node.

Thus, there remains a need for a high speed, high capacity network system for wireless transmission of 4 k/5 k ultra high definition video, studio quality TV, fast movies download, 3D live video streaming virtual reality broadband data, real-time kinetic video games multimedia, real-time 3D Ultra High Definition video/interactive stadium sporting (NFL, NBA, MLB, NHL, soccer, cricket, athletics events, tennis, etc.) environments, high resolution graphics, and corporate mission critical applications.

BRIEF SUMMARY OF THE DISCLOSURE

The present disclosure is directed to a Viral Molecular Network that is a high speed, high capacity terabits per second (Tbps) wireless network that has an adoptive mobile backbone and access levels. The network comprises of a three tier infrastructure using three types of communications devices, a United States country wide network and an international network utilizing the three communications devices in molecular system connectivity architecture to transport voice, data, video, studio quality and 4K/5K ultra high definition Television (TV) and multimedia information.

The network is designed around a molecular architecture that uses the Protonic Switches as nodal systems acting as photonic bodies that attracts a minimum of 400 Viral Orbital Vehicle access nodes (inside vehicles, on persons, homes, corporate offices, etc.) to each one of them and then concentrate their high capacity traffic to the third of the three communications devices, the Nucleus Switch which acts as communications hubs in a city. The Nucleus Switches communications devices are connected to each other in an intra and intercity core telecommunication backbone fashion. The underlying network protocol to transport information between the three communications devices (Viral Orbital Vehicle Viral Orbital Vehicle access device, Protonic Switch, and Nucleus Switch) is a cell framing protocol that these devices switch voice, data, and video packetized traffic at ultra-high speeds in the atto-second time frame. The key to the fast cell-based and atto-second switching and Orbital Time Slots multiplexing respectively is a specially designed integrated circuit chip called the Iwic (Instinctive Wise Integrated Circuit) that is the primary electronic circuitry in these three devices.

The Viral Molecular Network architecture consists of three network tiers that correlates with the three aforementioned communications devices:

The Access Network Layer (ANL) correlates with the Viral Orbital VehicleViral Orbital Vehicle access node communications devices.

The Protonic Switching Layer (PSL) that correlates with the Protonic Switch communications device.

The Nucleus Switching Layer (NSL) that correlates with the Nucleus Switch communications device.

The Viral Molecular Network is truly a mobile network, whereby the network infrastructure is actually moving as it transports the data between systems, networks, and end users. The Access Network Layer (ANL) and Protonic Switching Layer (PSL) of the network are being transported (mobile) by vehicles and persons as the network operates. This network differs from cellular telephone networks operated by the carriers, in the sense that the cellular networks actually are operated from stationary locations (the towers and switching systems are at fixed locations) and it is the end users who are mobile (cell phones, tablets, laptops, etc.) and not the networks. In the case of the Viral Molecular Network, the entire ANL and PSL are mobile because their network devices are in cars, trucks, trains, and on people who are moving, a true mobile network infrastructure. This is clear distinction of the Viral Molecular network.

In one embodiment of the invention, this disclosure relates to the Viral Orbital Vehicle access node that operates at the ANL of the Viral Molecular network.

Access Network Layer

The Viral Orbital Vehicle Architecture

The Access Network Layer (ANL) consists of the Viral Orbital Vehicle that is the touch point of the network for the customer. The Viral Orbital Vehicle collects the customer information streams in the form of voice, data, and video directly from Wi-Fi digital streams, HDMI, USB, RJ45, RJ11, and other types of high speed data and digital interfaces. The received customers information streams are placed into fix size cell frames (60 bytes payload and 7 bytes header) which are then placed in orbital time-slots (OTS) functioning in the atto-second range. These OTS are interleaved into an ultra-high speed digital stream operating in the terabits per second (Tbps) range. The Wi-Fi 33 interface of the Viral Orbital VehicleViral Orbital Vehicle is via an 802.11b/g/n antenna.

Viral Orbital Vehicle Atto-Second Multiplexer (ASM)

The Viral Orbital Vehicle is architected with the Iwic chip that basically provides the cell-based framing of all information signal that enters the ports of the device. The cell frames from each port is placed into the orbital time-slots at a very rapid rate and then interleaved in an ultra-high speed digital stream. The cell frames use a very low overhead frame length and is assigned its designated distant port at the Protonic Switching Node (PSL). The entire process of framing the ports' data digital streams and multiplexing them into atto-second time-slots is termed Atto-Second Multiplexing (ASM).

Viral Orbital Vehicle Ports Interfaces

The Viral Orbital Vehicle ASM ports can accept high speed data streams, ranging from 64 Kbps to 10 Gap's from Local Area Network (LAN) interfaces which is not limited to a USB port, and can be a high-definition multimedia interface (HDMI) port, an Ethernet port, a RJ11 modular connector, an IEEE 1394 interface (also known as FireWire) and/or a short-range communication ports such as a Bluetooth, Zigbee, near field communication, or infrared interface that carries TCP/IP packets or data streams from the Viral Molecular Network Application Programmable Interface (AAPI); Voice Over IP (VOIP), or video IP packets. The Viral Orbital Vehicle is equipped (always port 1) with a Wi-Fi capability to accept Wi-Fi_33 devices data streams and move their data across the network. The Wi-Fi_33 port acts as a hotspot access point for all Wi-Fi_33 devices within its range. The Wi-Fi_33 input data is converted into cell frames and are passed into the OTS process and subsequently the ASM multiplexing schema.

The Viral Orbital Vehicle does not read any of its port input data stream packet headers (such as IP or MAC addresses), it simply take the data streams and chop them into the 67 bytes cell frames and transports the raw data from its input to the terminating Viral Orbital Vehicle end port that delivers it to the designated terminating network or system. The fact that the Viral Orbital Vehicle does not spent time reading information stream packet header bits or trying to route these data streams based on IP or some other packet framing methodology, means that there is an infinitesimal delay time through the access Viral Orbital Vehicle ASM.

Viral Orbital Vehicle ASM Switching Function

The Viral Orbital Vehicle ASM also acts as transit switching device for information (voice, video, and data) that is not designated for one of its ports. The device constantly reads the cell frame header for its port designation addresses. If it does not see any of its ASM Designation address in the ASM Designation frame headers, then it simply passes on all cells to one of its wide area ports which transit the digital streams to its neighboring Viral Orbital Vehicle ASMs. This quick look up arrangement of the ASM networking technique once again reduces the transit delay times through the ASM and subsequently throughout the entire Viral network. These reduced overhead frames and lengths of the overhead frames, combined with the small fixed size cell process and the fixed hard-wired channel/time-slot ASM multiplexing technique reduces latency through the devices and increased data speed throughput in the network.

The Viral Orbital Vehicle is always adopted by a primary Protonic Switch at the Protonic Switching Layer in the network molecule that it is located. The Viral Orbital Vehicle selects the closest Protonic Switch as its primary adopter within the minimum five mile radius. At the same time the VIRAL ORBITAL VEHICLE selects the next nearest Protonic Switch as its secondary adopter, so that if its primary adopter fails it automatically pumps all of its upstream data to its secondary adopter. This process is carried out transparently to all user traffic originating, terminating, or transiting the VIRAL ORBITAL VEHICLE. Thus there is no disruption to the end user traffic during failures in the network at this layer. Hence this viral adoption and resiliency of the Viral Orbital Vehicle and their Protonic Switch adopters provides a high performance networking environment.

All of these design and networking strategies built into the network, starting from its access layer is what makes the Viral Molecular Network the fastest data switching and transport network and separates it from other networks, such as 4G LTE and numerous types common carriers' and corporate networks.

Viral Orbital Vehicle Radio Frequency System

The Viral Orbital Vehicle transmission schema is based on high frequency electromagnetic radio signals, operating at the ultra-high end of the microwave band. The frequency band is in the order of 200 to 3300 gigahertz range, at the upper end of the microwave spectrum and into the infrared spectrum. This band allocation is outside of the FCC restricted operating bands, thus allowing the Viral Molecular Network to utilize a wide bandwidth for its terabits digital stream. The RF section of the Viral Orbital Vehicle uses a broadband 16-bit Differential Phase Shift Key (DPSK) modulator/demodulator for its Intermediate Frequency (IF) into the RF transmitter/receiver. The power transmission wattage output is high enough for the signal to be receive with a decibel (dB) level that allows the recovered digital stream from the demodulator to be within a Bit Error Rate (BER) range of 1 part that is one bit error in every trillion bits. This ensures that the data throughput is very high over a long term basis.

The RF section will modulate four (4) digital streams running at 40 Gbits per second (GBbs) each, with a full throughput of 160 GBps. Each of these four digital streams will be modulated with the 16-bit DPSK and converted into IF signal which is placed on a RF carrier.

Viral Orbital Vehicle Clocking & Synchronization

The Viral Orbital Vehicle synchronizes its receive and transmit data digital streams to the national viral molecular network reference atomic oscillator. The reference oscillator is tied to the Global Positioning System as its standard. All of the Viral Orbital Vehicle are configured in a recovered clock formation so that the entire access network is synchronized to the Protonic Switching and Nucleus layers of the network. This will ensure that the bit error rate (BER) of the network at the access level will be in the order of 1 part of 1,000,000,000,000.

The access device uses the intermediate frequency (IF) signal in the 16 bit DPSK modem to recover the digital clocking signal by using its internal Phase Lock Loop (PLL) to control the local oscillator. The phased locked local oscillator then produces several clocking signals which are distributed to the Iwic chip that drives the cell framing formatting and switching; orbital time-slot assignment; and atto-second multiplexing. Also the network synchronized derived clock signal times in the end users and access systems digital data stream, VOIP voice packets, IP data packets/MAC frames, native AAPI voice and video signals into the Viral Orbital Vehicle's access ports.

End User Application

The end users connected to the Viral Orbital Vehicle will be able to run the following applications:

INTERNET ACCESS
VEHICLE ONBOARD DIAGNOSTICS
VIDEO & MOVIE DOWNLOAD
ON-NET CELL PHONE CALLS
LIVE VIDEO STREAMING/TV
HIGH RESOLUTION GRAPHICS
MOBILE VIDEO CONFERENCING
HOST TO HOST
PRIVATE CORPORATE NETWORK SERVICES

The Viral Orbital Vehicle access node comprises of a housing that has one (1) to six (6) physical USB, (HDMI) port, an Ethernet port, a RJ11 modular connector, an IEEE 1394 interface (also known as FireWire) and/or a short-range communication ports such as a Bluetooth, Zigbee, near field communication, or infrared interface. These physical ports receive the end user information. The customer information from a computer which can be a laptop, desktop, server, mainframe, or super computer; a tablet via a Wi-Fi_33 or direct cable connection; a cell phone; voice audio system; streaming video from a video server; news TV studio quality TV systems video signals; 3D sporting events TV cameras signals, 4K/5K ultra high definition TV signals; movies download information signal; in the field real-time TV news reporting video stream; broadcast movie cinema theaters network video signals; a Local Area Network digital stream; game console, virtual reality data; kinetic system data; Internet TCP/IP data; nonstandard data; residential and commercial building security system data, remote control telemetry systems information for remote robotics manufacturing machines devices signals and commands; building management and operations systems data; Internet of Things data streams that includes but not limited to home electronic systems and devices, home appliances management and control signals, factory floor machinery systems performance monitoring, management, and control signals data, personal electronic devices data signals, etc. After the aforementioned multiplicity of customers' data digital streams traverse the Viral Orbital Vehicle access node ports interfaces, they are clocked into the Viral Orbital Vehicle communications device integrated circuits (IC) gates by the internal oscillator digital pluses that are synchronized to from the phase lock loop (PLL) recovered clock signals which are distributed throughout the device circuitry to time and synchronize all digital data signals. The customer digital streams are then encapsulated into the viral molecular network's formatted 67 bytes cell frames. These cell frames are equipped with cell sequencing numbers, source and destination addresses, and switching management control headers consisting of 7 bytes with a cell payload of 60 bytes.

The Viral Orbital Vehicle access node device housing embodiment includes the function of placing the 67 bytes cell frames into the Viral molecular network application specific integrated circuit (ASIC) called the Iwic which stands for Instinctively Wise Integrated Circuit. The Iwic is the cell switching fabric of the Viral Orbital Vehicle. This chip operates in the terahertz frequency rates and it takes the cell frames that encapsulates the customer's digital stream information and place them onto the high speed switching buss. The Viral Orbital Vehicle access node has four parallel high speed switching busses. Each buss runs at 2 terabits per second (TBps) and the four parallel busses move the customer digital stream encapsulated in the cell frames at combined digital speed of 8 Terabits per second (Tbps). The cell switch provides a 8. Tbps switching throughput between its customers connected ports and the data streams that transit the Viral Orbital Vehicle.

The Viral Orbital Vehicle housing has an Atto Second Multiplexing (ASM) circuitry that uses the Iwic chip to place the switched cell frames into orbital time slots (OTS) across four digital stream running at 40 Gigabits per second (Gbps) each, providing an aggregate data rate of 160 Gbps. The ASM takes cell frames from the high speed busses of the cell switch and places them into orbital time slots of 0.25 micro seconds period, accommodating 10,000 bits per time slot (OTS). Ten of these orbital time slots makes one of the Atto Second Multiplexing (ASM) frames, therefore each ASM frame has 100,000 bits every 2.5 micro second. There are 400,000 ASM frames every second in each 40 Gbps digital stream. The ASM moves 160 Gbps via 4 digital streams to the intermediate frequency (IF) modem of the radio frequency section of the Viral Orbital Vehicle.

In this embodiment the Viral Orbital Vehicle has a radio frequency (RF) section that consist of a quad intermediate frequency (IF) modem and RF transmitter/receiver with four RF signals. The IF modem is a 16 bit Differential Phase Shift Key (DPSK) that takes the four individual 40 Gbps digital streams from the ASM modulate them into an IF gigahertz frequency which is then mixed with one of the four RF carriers. The RF carriers is in the 200 to 3300 Gigahertz (GHz) range.

The Viral Orbital Vehicle housing has an oscillator circuitry that generates all of the digital clocking signals for all of the circuitry that needs digital clocking signals to time their operation. These circuitry are the port interface drivers, high speed busses, ASM, IF modem and RF equipment. The oscillator is synchronized to the Global Positioning System by recovering the clocking signal from the received digital streams of the Protonic Switches. The oscillator has a phase lock loop circuitry that uses the recovered clock signal from the received digital stream and control the stability of the oscillator output digital signal.

The second embodiment of the invention in this disclosure is the Protonic Switch communications device that comprises of the Protonic Switching Layer of the Viral Molecular Network.

Protonic Switching Layer

PSL Configuration

The Protonic Switching Layer (PSL) of the viral molecular network is the first stage of the network that congregate the virally acquired viral orbital vehicle high speed cell frames and expeditiously switch them to destination port on a viral orbital vehicle or the Internet via the Nucleus Switch. This switching layer is dedicated to only switching the cell frames between viral orbital vehicles and Nucleus Switches. The switching fabric of the PSL is the work-horse of the viral molecular network. These switches do not examine any underlying protocol such as TCP/IP, MAC frames, or any standard or protocol or even any native digital stream that have been converted into the viral cell frames.

The Protonic Switch is positioned, installed, and placed in: homes; cafes such as Starbucks, Panera Bread, etc.; vehicles (cars, trucks, RVs, etc.); school classrooms and communications closets; a person's pocket or pocket books; corporate offices communications rooms, workers desktops; aerial drones or balloons; data centers, cloud computing locations, Common Carriers, ISPs, news TV broadcast stations; etc.

PSL Switching Fabric

The PSL switching fabric consists of a core cell switching node surrounded by four ASM multiplexers running four individual 16 bit DPSK modems and associated RF system. The Four ASM/16 Phase Modems/RF systems drives a total bandwidth of 16×40 GBps digital steams, adding up to a high capacity digital switching system with an enormous bandwidth of 0.64 Terabits per second (0.64 TBps) or 640,000,000,000 bits per second.

PSL Switching Performance.

The core of the cell switching fabric consists of several high speed buss that accommodate the passage of the data from the ASM orbital time-slots and place them in the queue to read the cell frames destination identifiers by the cell processor. The cells that came in from the viral orbital vehicles are automatically switched to the time-slots that are connected to the Nucleus Switching hubs at the central switching nodes in the core backbone network. This arrangement of not looking up routing tables for the viral orbital vehicle cells that transit the Protonic Switches radically reduces latency through the protonic nodes. This helps to improve the overall network performance and increases data throughput across the infrastructure.

PSL Switching Hierarchy

The hierarchical design of the network whereby the viral orbital vehicles do communicate only with each other and the Protonic nodes simplifies the network switching processes and allows a simply algorithm to accommodate the switching between viral orbital vehicles and between the Protonic nodes and their acquired orbiting viral orbital vehicles. The Hierarchical design also allows the Protonic nodes to switch cells only between the viral orbital vehicles and the Nucleus Switching nodes. Protonic nodes do not switch cells between each other. The switching tables in the Protonic nodes memory only carries their acquired viral orbital vehicles designation ports that keeps tracks of these viral orbital vehicles orbital status, when they are on and acquired by the node. The Protonic node reads the incoming cells from the Nucleus nodes, looks up the atomic cells routing tables, and then insert them into the orbital time-slots in the ASM that is connected to that designation viral orbital vehicle where the cell terminates.

Protonic Switching Layer Resiliency

The network is architected at the PSL to allow viral behavior of the viral orbital vehicles not just when they are being adopted by a Protonic Switch but also when they lose that adoption due to a failure of a protonic switch. When a protonic switch is turned off or its battery dies, or a component fails in the device, all of the viral orbital vehicles that were orbiting that switch as they primary adopter are automatically adopted to their secondary Protonic Switch. The orbital viral orbital vehicles traffic is switched to their new adopter instantaneously and the service continues to function normally. Any loss of data during the ultra-fast adoption transition of the viral orbital vehicles between the failed primary Protonic Switch and the secondary Protonic Switch is compensated at the end user terminating host or digital buffers in the case of native voice or video signals.

The viral orbital vehicles play a critical role along with the Protonic Switches is network recover due failures. The viral orbital vehicles immediately recognizes when its primary adopter fails or go offline and instantaneously switches all upstream and transitory data that using its primary adopter route to its secondary adopter other links. The viral orbital vehicles that lost their primary adopter now makes their secondary adopter their primary adopter. These newly adopted viral orbital vehicles then seek out a new secondary adopting Protonic Switch within their operating network molecule. This arrangement stays in place until another failure occurs to their primary adopter, then the same viral adoption process is initiated again.

Protonic Node Local Viral Orbital Vehicles

Each Protonic Switching node is equipped with a viral orbital vehicle 200 for collecting local end user traffic so that the vehicle housing these switches are also given network access at this point. The locally attached viral orbital vehicle is hard wired to one of the Protonic Switch's ASMs via a USB port. This is the only originating and terminating port that the PSL layer accommodates. All other PSL ports are purely transition port, that is, ports that transit traffic between the Access Network Layer (viral orbital vehicles) and the Nucleus Switching Layer (Core Energetic Layer).

The local viral orbital vehicles 200 has a secondary radio frequency (RF) port that also connects it to the network molecule that it is located. This viral orbital vehicle uses the local hard wired connected Protonic Switch (its closest) as its primary adopter and the adopter connected to its RF port as its secondary adopter. If the local Protonic Switch fails, then the local viral orbital vehicles goes into the resilient adoption and network recovery process.

Protonic Switch Port Interfaces

The Protonic Switches are equipped with a minimum of six external port interface for the local viral orbital vehicles device end users connection. This internal Viral Orbital Vehicle runs at 40 GBps and transfers its data from the viral orbital vehicles to the molecular network. The other interfaces of the switch is at the RF level running at 16×40 GBps across four 200-3300 GHz signals. This switch is basically self-contained and has all of digital signal movement across its ultra-high terabits per second buss that connects its switching fabric, ASMs, and 16-Phase PSK modulators.

Protonic Switch Clocking & Synchronization

The PSL is synchronized to the NSL and ANL systems using recovery-looped back clocking schema to the higher level standard oscillator. The standard oscillator is referenced to the GPS service worldwide, allowing clock stability. This high level of clocking stability when distributed to the PSL level via the NSL system and radio links gives a clocking and synchronization stability.

The PSL nodes are all set for recovered clock from the Intermediate Frequency at the demodulator. The recovered clock signal controls the internal oscillator and reference its output digital signal which then drives the high speed buss, ASM gates and Iwic chip. This makes sure that all of the digital signal that are being switched and interleaved in the orbital time-slots of the ASM are precisely synchronized and thus reducing bit errors rate.

The Protonic switch is the second communications device of the Viral Molecular network and it has a housing that is equipped with a cell framing high speed switch. The Protonic Switch includes the function of placing the 67 bytes cell frames into the Viral molecular network application specific integrated circuit (ASIC) called the Iwic which stands for Instinctively Wise Integrated Circuit. The Iwic is the cell switching fabric of the Viral Orbital Vehicle, Protonic Switch, and Nucleus Switch. This chip operates in the terahertz frequency rates and it takes the cell frames that encapsulates the customers digital stream information and place them onto the high speed switching buss. The Protonic Switch has sixteen (16) parallel high speed switching busses. Each buss runs at 2 terabits per second (TBps) and the sixteen parallel busses move the customer digital stream encapsulated in the cell frames at combined digital speed of 32 Terabits per second (Tbps). The cell switch provides a 32 Tbps switching throughput between its Viral Orbital Vehicle connected to it and the Nucleus Switches.

The Protonic Switch housing has an Atto Second Multiplexing (ASM) circuitry that uses the Iwic chip to place the switched cell frames into orbital time slots (OTS) across sixteen digital streams running at 40 Gigabits per second (Gbps) each, providing an aggregate data rate of 640 Gbps. The ASM takes cell frames from the high speed busses of the cell switch and places them into orbital time slots of 0.25 micro seconds period, accommodating 10,000 bits per time slot (OTS). Ten of these orbital time slots makes one of the Atto Second Multiplexing (ASM) frames, therefore each ASM frame has 100,000 bits every 2.5 micro second. There are 400,000 ASM frames every second in each 40 Gbps digital stream. The ASM moves 640 Gbps via 16 digital streams to the intermediate frequency (IF) modem of the radio frequency section of the Protonic Switch.

In this embodiment the Protonic Switch has a radio frequency (RF) section that consist of four (4) quad intermediate frequency (IF) modems and RF transmitter/receiver with 15 RF signals. The IF modem is a 16 bit Differential Phase Shift Key (DPSK) that takes the 16 individual 40 Gbps digital streams from the ASM modulate them into an IF gigahertz frequency which is then mixed with one of the 16 RF carriers. The RF carriers is in the 200 to 3300 Gigahertz (GHz) range.

The Protonic Switch housing has an oscillator circuitry that generates all of the digital clocking signals for all of the circuitry that needs digital clocking signals to time their operation. These circuitry are the port interface drivers, high speed busses, ASM, IF modem and RF equipment. The oscillator is synchronized to the Global Positioning System by recovering the clocking signal from the received digital streams of the Protonic Switches. The oscillator has a phase lock loop circuitry that uses the recovered clock signal from the received digital stream and control the stability of the oscillator output digital signal.

The Third embodiment of the invention in this disclosure is the Nucleus Switch communications device that comprises of the Nucleus Switching Layer of the Viral Molecular Network.

Nucleus Switching Layer

Core Energetic Backbone Network

The high capacity backbone of viral molecular network is the Nucleus Switching Layer that consists of the terabits per second ASMs, ultra high speed switching fabrics, and broadband fiber optics SONET based intra and inter city facilities. This section of the network is the primary interface into the Internet, public local exchange and inter exchange common carriers, international carriers, corporate networks, content providers (TV, news, movies, etc.), and government agencies (nonmilitary).

The Nucleus Switches front end by ASMs that are connected to the Protonic Switches via RF signals. The hub ASMs acts as intermediary switches between the PSL and the core backbone switches. These ASMs are equipped with a switching fabric that functions as a shield for the Nucleus Switches in keeping local intra city traffic from accessing them in order to eliminate inefficiencies, of using the Nucleus Switches to switch non-core backbone network traffic. This arrangement keeps local transitory traffic between the viral orbital vehicle nodes, the Protonic Switches, and the hub ASMs within the local ANL and PSL levels. The hub ASMs selects all traffic that are designated for the Internet, other cities outside the local area, host to host high speed data traffic, private corporate network information, native voice and video signals that are destined to specific end users systems, video and movie download request to content providers, on-net cell phone calls, 10 gigabit Ethernet LAN services, etc. FIG. 13.0 shows the ASM switching controls that keeps local traffic within the local Molecule Networks domains.

The Nucleus Switch device housing embodiment includes the function of placing the 67 bytes cell frames into the viral molecular network application specific integrated circuit (ASIC) called the Iwic which stands for Instinctively Wise Integrated Circuit. The Iwic is the cell switching fabric of the Viral Orbital Vehicle, Protonic Switch, and Nucleus Switch. This chip operates in the terahertz frequency rates and it takes the cell frames that encapsulates the customers digital stream information and place them onto the high speed switching buss. The Nucleus Switch has from 100 to 1000 parallel high speed switching busses depending on the amount of Nucleus Switches that are implemented at the Nucleus hub location. The Nucleus Switches are designed to be stacked together by inter connecting up to a maximum of 10 of them via their fiber optics ports to form a contiguous matrix of Nucleus Switches providing a maximum 1000 parallel busses×2 terabits per second (TBps) per buss. Each buss runs at 2 TBps) and the 1000 stacked parallel busses move the customer digital stream encapsulated in the cell frames at combined digital speed of 2000 Terabits per second (Tbps). The 10 stacked cell switch provides a 2000 Tbps switching throughput between its connected Proton Switches; other viral molecular network intra city, intercity, and international Nucleus hub location; high capacity corporate customers systems; Internet Service Providers; Inter-Exchange Carriers, Local Exchange Carriers; cloud computing systems; TV studio broadcast customers; 3D TV sporting event stadiums; movies streaming companies; real time movie distribution to cinemas; large content providers, etc.

The Nucleus Switch housing has an Atto Second Multiplexing (ASM) circuitry that uses the Iwic chip to place the switched cell frames into orbital time slots (OTS) across sixteen digital streams running at 40 Gigabits per second (Gbps) each, providing an aggregate data rate of 640 Gbps. The ASM takes cell frames from the high speed busses of the cell switch and places them into orbital time slots of 0.25 micro seconds period, accommodating 10,000 bits per time slot (OTS). Ten of these orbital time slots makes one of the Atto Second Multiplexing (ASM) frames, therefore each ASM frame has 100,000 bits every 2.5 micro second. There are 400,000 ASM frames every second in each 40 Gbps digital stream. The ASM moves 640 Gbps via 16 digital streams to the intermediate frequency (IF) modem of the radio frequency section of the Protonic Switch.

The Nucleus housing includes fiber optic ports running at 39.8 to 768 Gbps to connect to other Viral molecular network intra city, intercity, and international Nucleus hub locations; high capacity corporate customers systems; Internet Service Providers; Inter-Exchange Carriers, Local Exchange Carriers; cloud computing systems; TV studio broadcast customers; 3D TV sporting event stadiums; movies streaming companies; real time movie distribution to cinemas; large content providers, etc.

Core Backbone Network Switching Hierarchy

The backbone switches connects the major NFL cities (Table 1.0) at the high capacity bandwidth tertiary level and the integrate the secondary layer of the core in smaller cities. The International backbone layer connects the major international cities listed under Table 2.0.

TABLE 1.0

PHASE I

| CITY | STATE | ASMs | NUCLEUS SWITCH | FIBER/RF |
|---|---|---|---|---|
| 1. Atlanta | Georgia | 28 | 14 | OC-768/YES |
| 2. Baltimore | Maryland | 6 | 3 | OC-768/YES |
| 3. Boston | Massachusetts | 6 | 3 | OC-768/YES |
| 4. Buffalo | New York | 3 | 2 | OC-768/YES |
| 5. Charlotte | North Carolina | 10 | 5 | OC-768/YES |
| 6. Chicago | Illinois | 40 | 20 | OC-768/YES |
| 7. Cincinnati | Ohio | 6 | 3 | OC-768/YES |
| 8. Cleveland | Ohio | 7 | 4 | OC-768/YES |
| 9. Dallas | Texas | 30 | 15 | OC-768/YES |
| 10. Denver | Colorado | 22 | 11 | OC-768/YES |
| 11. Detroit | Michigan | 24 | 12 | OC-768/YES |
| 12. Green Bay | Wisconsin | 10 | 5 | OC-768/YES |
| 13. Houston | Texas | 30 | 15 | OC-768/YES |
| 14. Indianapolis | Indiana | 8 | 4 | OC-768/YES |
| 15. Jacksonville | Florida | 8 | 4 | OC-768/YES |
| 16. Los Angeles | California | 55 | 28 | OC-768/YES |
| 17. Miami | Florida | 25 | 12 | OC-768/YES |
| 18. Minneapolis | Minnesota | 14 | 7 | OC-768/YES |
| 19. Nashville | Tennessee | 14 | 7 | OC-768/YES |
| 20. New Orleans | Louisiana | 15 | 8 | OC-768/YES |
| 21. New York | New York | 70 | 35 | OC-768/YES |
| 22. Oakland | California | 14 | 7 | OC-768/YES |
| 23. Philadelphia | Pennsylvania | 34 | 17 | OC-768/YES |
| 24. Phoenix | Arizona | 22 | 11 | OC-768/YES |
| 25. Pittsburgh | Pennsylvania | 24 | 12 | OC-768/YES |
| 26. St Louis | Missouri | 22 | 11 | OC-768/YES |
| 27. San Diego | California | 25 | 13 | OC-768/YES |
| 28. San Francisco | California | 27 | 14 | OC-768/YES |
| 29. Seattle | Washington | 22 | 11 | OC-768/YES |
| 30. Tampa | Florida | 20 | 10 | OC-768/YES |
| 31. Washington | DC | 29 | 14 | OC-768/YES |

TABLE 2.0

INTERNATIONAL HUBS

| CITY | COUNTRY | ASM | NUCLEUS SWITCH | FIBER/RF |
|---|---|---|---|---|
| PHASE I | | | | |
| 1. New York | United States | 26 | 13 | OC-192/YES |
| 2. Washington DC | " | 18 | 9 | OC-192/YES |
| 3. Atlanta | " | 18 | 9 | OC-192/YES |
| 4. Miami | " | 18 | 9 | OC-192/YES |
| 5. San Francisco | " | 14 | 7 | OC-192/YES |
| 6. Los Angeles | " | 20 | 10 | OC-192/YES |
| 7. Hawaii | " | 20 | 10 | OC-192/YES |
| PHSAE II | | | | |
| 8. London | United Kingdom | 26 | 13 | OC-192/YES |
| 9. Paris | France | 18 | 9 | OC-192/YES |
| 10. Tokyo | Japan | 14 | 7 | OC-192/YES |
| 11. Melbourne | Australia | 20 | 10 | OC-192/YES |
| 12. Sydney | " | 20 | 10 | OC-192/YES |
| PHASE III | | | | |
| 13. Beijing | China | 20 | 10 | OC-192/YES |
| 14. Hong Kong | " | 20 | 10 | OC-192/YES |
| 15. Mumbai | India | 14 | 7 | OC-48/YES |
| 16. Tel Aviv | Israel | 14 | 7 | OC-48/YES |
| 17. Lagos | Nigeria | 10 | 5 | OC-12/YES |
| 18. Cape Town | South Africa | 10 | 5 | OC-12/YES |
| 19. Johannesburg | " | 8 | 4 | OC-12/YES |
| 20. Addis Ababa | Ethiopia | 6 | 3 | OC-3/YES |
| 21. Djibouti City | Djibouti | 10 | 5 | OC-12/YES |
| PHASE IV | | | | |
| 22. San Paulo | Brazil | 14 | 7 | OC-48/YES |
| 23. Rio De Janero | " | 14 | 7 | OC-48/YES |
| 24. Buenos Aires | Argentina | 14 | 7 | OC-48/YES |
| 25. Caracas | Venezuela | 14 | 7 | OC-48/YES |

North America Backbone Network

The Viral Molecular North America backbone network as illustrated in FIG. 15.0, initially consists of the following major cities network hubs that are equipped with core Nucleus Switches are Boston, New York, Philadelphia, Washington D.C., Atlanta, Miami, Chicago, St. Louis, Dallas, Phoenix, Los Angeles, San Francisco, Seattle, Montreal, and Toronto. The facilities between these hubs are multiple fiber optic SONET OC-768 circuits terminating on the Nucleus switches. These locations are based on their metropolitan concentration of people; with New York city metro totaling some 19,000,000; Los Angeles having over 13,000,000; Chicago with 9,555,000; Dallas and Houston each with over 6,700,000; Washington D.C., Miami, and Atlanta metros each boasting more than 5,500,000; etc.

North America Backbone Network Self-Healing Ring

The network is designed with self-healing rings between the key hubs cities as displayed in FIG. 16.0. The rings allow the Nucleus Switches to automatically reroute traffic when a fiber optic facility fails. The switches recognizes the loss of the facility digital signal after a few micro-seconds and immediately goes into service recovery process and switch all of the traffic that was being sent to the failed facility to the other routes and distribute the traffic across those routes depending on their original destination.

For example if multiple OC-768 SONET fiber facilities between San Francisco and Seattle fails, the Nucleus Switches between these two locations immediately recognizes this failed condition and take corrective action. The Seattle switches start rerouting the traffic destined for San Francisco location and transitory traffic through the Chicago and St. Louis switches and back to San Francisco.

The same series of actions and network self-healing processes are initiated when failures occur between Chicago and Montreal, with the switches pumping the recovered traffic destined for Chicago through Toronto and New York and back to Chicago. A similar set of actions will be taken by the switches between Washington D.C. and Atlanta to recover the traffic lost between these two locations by switching them through Chicago and St. Louis. All of these actions are executed instantaneously without the knowledge of end users and without any impact on their services. The speed at which this rerouting takes place at is faster than the end systems can respond to the failure of the fiber facilities.

The natural respond by most end systems such as TCP/IP devices is to retransmit any small amount of loss data and most digital voice and video systems' line buffering will compensate for the momentary loss of data stream.

This self-healing capability of the network keeps its operational performance in the 99.9 percentile. All of these performance and self-correcting activities of the network is captured by the network management system and the Global Network Control Centers (GNCCs) personnel.

Global Backbone Network

Global Core Backbone Network

The six selected major switching hub cities (New York, Washington D.C., Atlanta, Miami, San Francisco, and Los Angeles) provide the high capacity data transport across North America and transit traffic to the core hubs in London, UK and Paris, France (hubs for EMEA region—Europe, Middle-East, and Africa): Tokyo, Japan; Beijing and Hong Kong China; Melbourne and Sydney, Australia, Mumbai, India; and Tel Aviv, Israel (hubs for ASPAC region—Asia Pacific): and Caracas, Venezuela; Rio De Janero and San Paulo, Brazil; and Buenos Aires, Argentina (hubs for CCSA region—Caribbean, Central & South America). FIG. 19.0 shows the global core backbone network.

The other international network locations includes Lagos, Nigeria; Cape Town and Johannesburg, South Africa; Addis Ababa, Ethiopia; Djibouti City, Djibouti. All of the international switching hubs use the Nucleus switches front end by the ASM high capacity multiplexers. Theses switches are multiplexers are integrated with the local in-country switches and multiplexers. The global and national backbone networks work as an harmonious homogeneous infrastructure. This means that all of the neighboring switches know the operational status of each other and react to the environment in terms of efficient switching and instantaneous recovery when a network failure occurs.

Global Traffic Switching Management

The switches routing and mapping systems are configured to manage the network traffic on a national and international level based on cost factors an bandwidth distribution efficiency. The global core backbone network is divided into molecular domains on a national level which feeds into the tertiary global layer of the network as depicted in FIG. 18.0.

The entire traffic management process on a global scale is self-manage by the switches at the Access Network Layer (ANL), Protonic Switching Layer (PSL), Nucleus Switching Layer (NSL), and the International Switching Layer (ISL).

Access Network Layer Traffic Management

At the ANL level the viral orbital vehicles determine which traffic is transiting its node and switch it to one of its four neighboring viral orbital vehicle depending on the cell frame destination node. At the ANL level, all of the traffic traversing between the viral orbital vehicles are being terminated on one of the viral orbital vehicles in that atomic domain. The Protonic Switch that acts as a gate keeper for the atomic domain that its presides over. Therefore once traffic is moving within the ANL, it is either on its way from its source viral orbital vehicle to its presiding Protonic Switch, that had already adopted it as its primary adopter; or it is being transit toward its destination viral orbital vehicle. Hence all of the traffic in an atomic domain is for that domain in the form of leaving its viral orbital vehicle on its way to the Protonic Switch to go toward the Nucleus Switch and then sent to the Internet, a corporate host, native video or on-net voice/calls, movie download, etc. or being transit to be terminated on one of the viral orbital vehicles in the domain. This traffic management makes sure that traffic for other atomic domains are not using bandwidth and switching resources in another domain, thus achieving bandwidth efficiency within the ANL.

Protonic Switching Layer Traffic Management

The Protonic Switches has the presiding responsibility of managing the traffic in its atomic molecular domain and blocking all traffic destined to another atomic molecular domain from entering its locally attached domain. Also the Protonic Switch has the responsibility of switching all traffic to the hub ASMs. The Protonic Switches read the cell frames header and directs the cells to the ASMs for inter atomic molecular domains traffic; intra city or inter city traffic; national or international traffic. The Protonic Switches do not have to separate the aforementioned traffic groups, instead it simply look for its atomic domain traffic on the outbound and inbound traffic. If the inbound traffic cell frame header does not have its atomic domain header, it blocks it from entering its atomic domain and switch it back to its hub ASM switch. All outbound traffic from the viral orbital vehicles are switched by the Protonic Switch directly to its presiding hub ASM switch. This switching and traffic management design of the Protonic Switches minimizes the amount of switching management that they have to do, thus speeding up switching and reducing traffic latency through the switches.

Nucleus & Hub ASMs Switching/Traffic Management

The hub ASMs directs all traffic from the PSL level to other atomic domains within the molecular domain that it oversee. In addition, the hub ASMs switch the traffic that is destined for other ASMs' molecular domains or send the traffic to the Nucleus Switches. Therefore the hub ASMs manage all intra city traffic between molecular domains.

These ASMs block all local traffic from entering the Nucleus Switch and the national network. The ASMs read the cell frames headers to determine the destination of the traffic and switch all traffic destined for another city or internationally to the Nucleus Switch. This arrangement keeps all local traffic from entering the national or international core backbone.

The Nucleus Switches are strategically located at the major cities around the world. These switches are responsible for managing traffic between the cities within a national network. The switches read the cell frames headers and route the traffic to the peers in within the national networks and between the International Switches. These switches insure that domestic traffic are kept out of the international core backbone which eliminate national traffic from using expensive international facilities, reduces network latency, increase bandwidth utilization efficiency.

International Traffic Management

The International Switches preside over the traffic passed to it from the national networks destined to our countries as shown in FIG. 18.0. These switches only focus on cells that the national switches pass to them and do not get involved with national traffic distribution. International Switches examines the cell frames headers and determines which country the cells are destined and switch them to correct international node and associated Sonet facility.

Several International Switches function as global gateway switches that interface each of the four global regions: The global gateway switches in the US in San Francisco and Los Angeles function as the North America (NA) regional hubs connecting t\he ASPAC region at Sydney, Australia and Tokyo, Japan. The four gateway switches on the East Coast of the United States of America in New York and Washington D.C. connect the Europe Middle East & Africa (EMEA) Europe gateways in London, United Kingdom and Paris, France. The two gateway nodes in Atlanta and Miami connects the gateway nodes in Caribbean, Central & South America (CCSA) region at the cities of Rio De Janero, Brazil and Caracas, Venezuela.

The gateway nodes in Paris connects to the gateway nodes in Lagos, Nigeria and Djibouti City, Djibouti in Africa. The London City will node connects the western part of Asia in Tel Aviv, Israel. This design provides an hierarchical configuration that isolates traffic to various regions. For example, the gateway node in Djibouti City and Lagos reads the cell frames of all of the traffic coming into and leaving Africa and only allow traffic terminating on the continent to pass through. Also these switches only allow traffic that are destined for another region to leave the continent. These switches blocks all intra continental traffic from passing to the other regions' gateway switches. This capability of these switches manage the continental traffic and transiting traffic for other regions.

Global Network Self-Healing Design

The global core network as depicted in FIG. 18.0 is designed with self-healing rings connecting the global gateway switches. The first ring is formed between New York, Washington D.C., London and Paris. The second ring is between Atlanta, Miami, Caracas, and Rio De Janero. The third ring is between London, Paris, Johannesburg, and Cape Town. The fourth ring is between London, Beijing, Paris, and Hong Kong. The fifth ring is between Beijing, San Francisco, Los Angeles, and Sydney. These rings are design in such a manner that if one of the Sonet facilities fails, then the gateway switches in that ring will immediately go into action of rerouting the traffic around the failure as shown in FIG. 19.0.

The gateway switches are so configured that if the Sonet facility fails in ring number two between Atlanta and Rio De Janero, the switches immediately recognize the problem and start to reroute the traffic that was using this path through the switches and facilities in Atlanta, Caracas, San Paulo and then to its original destination in Rio De Janero. The same scenario is show on ring number four after a failure between Israel and Beijing. The switches between the two facilities reroute the traffic around the failed facility from Tel Aviv to London then through Paris, Djibouti City, India, Hong Kong, and to Beijing. All of this is carried out between the switches in micro seconds. The speed of healing these failed rings result in minimal loss of data and in most cases will not even be notice by the end users and their systems. All of the rings between the gateway nodes are self-healing, thus making the network very robust in term of recovery and performance.

Global Network Control Centers

The viral molecular network is controlled by three Global Network Control Centers (GNCCs) as shown in FIG. 18.0. The GNCCs manage the network on an and-to-and basis by monitoring all of the International, Nucleus, ASMs, and Protonic switches. Also the GNCCs monitor the viral orbital vehicles. The monitoring process consists of receiving the system status of all network devices and systems across the global. All of the monitoring and performance reporting is carried out in real time. At any moment the GNCCs can instantaneously determine the status of any one of the aforementioned network switches and system.

The three GNCCs are strategically located in Sydney, London, and New York. These GNCCs will operate 24 hours per day 7 days per week (24/7) with the controlling GNCC following the sun, The controlling GNCC starts with the first GNCC in the East, being Sydney and as the Earth turns with the Sun covering the Earth from Sydney to London to New York. This means that while the UK and United States are sleeping at nights (minimal staff), Sydney GNCC will be in charge with its full complement of day-shift staff. When Australia business day comes to end and their go on minimal staff, then following the Sun, London will now be up and running at full staff and take over the primary control of the network. This process is later followed by New York taking control as London staff winds down the business day. This network management process is called follow the sun and is very effective in management of large scale global network.

The GNCC will be co-located with the Global Gateway hubs and will be equipped with various network management tools such as the viral orbital vehicle, Protonic, ASMs, Nucleus, and International switching NMSs (Network Management Systems). The GNCCs will each have a Manager of Manager network management tool called a MOM. The MOM consolidates and integrates all of the alarms and performance information that are received from the various networking systems in the network and present them in a logical and orderly manner. The MOM will present all alarms and performance issues as root cause analysis so that technical operations staff can quickly isolate the problem and restore any failed service. Also with the MOM comprehensive real-time reporting system, the viral molecular network operations staff will be proactive in managing the network.

DETAILED DESCRIPTION OF THE DISCLOSURE

The present disclosure is directed to a Viral Molecular Network that is a high speed, high capacity terabits per second (Tbps) wireless network that has an adoptive mobile backbone and access levels. The network comprises of a three tier infrastructure using three types of communications devices, a United States country wide network and an international network utilizing the three communications devices in a molecular system connectivity architecture to transport voice, data, video, studio quality and 4K/5K ultra high definition Television (TV) and multimedia information.

The network is designed around a molecular architecture that uses the Protonic Switches as nodal systems acting as protonic bodies that attracts a minimum of 400 Viral Orbital Vehicle access nodes (inside vehicles, on persons, homes, corporate offices, etc.) to each one of them and then concentrate their high capacity traffic to the third of the three communications devices, the Nucleus Switch which acts as communications hubs in a city. The Nucleus Switches communications devices are connected to each other in a intra and intercity core telecommunication backbone fashion. The underlying network protocol to transport information between the three communications devices (Viral Orbital Vehicle access device, Protonic Switch, and Nucleus Switch) is a cell framing protocol that these devices switch voice, data, and video packetized traffic at ultra-high speeds in the atto-second time frame. The key to the fast cell-based and atto-second switching and Orbital Time Slots multiplexing respectively is a specially designed integrated circuit chip called the Iwic (Instinctive Wise Integrated Circuit) that is the primary electronic circuitry in these three devices.

Figure 1:
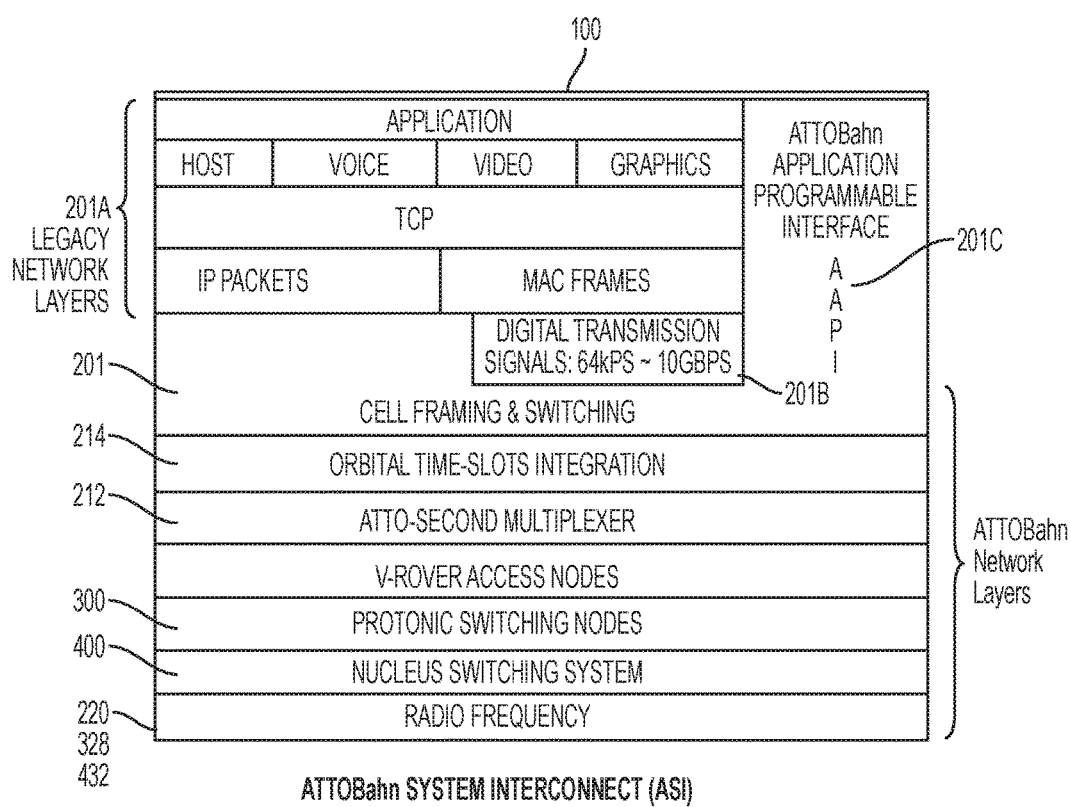
FIG. 1.0 is a block diagram of viral molecular network architecture that displays the hierarchical layout of this high speed, high capacity terabits per second (Tbps) wireless network that has an adoptive mobile backbone and access levels, shown in an embodiment of the invention.

As an embodiment of this invention FIG. 1.0 shows the viral molecular network architecture from the application to the radio frequency transmission layers 100. The architecture is designed with two interfaces to the end users' applications: 1. Legacy applications 201A that consists of using TCP/IP and MAC data link protocols which are then encapsulated into the viral molecular network cell frames by its cell framing and switching system 201. The architecture also accommodates a second type of application called digital streaming bits (64 Kbps to 10 Gbps) 201B with or without any known protocol and chop them up into the viral molecular network cell frame format by its cell framing and switching system 201. This type of application could be a high speed digital signal from a transmission equipment such as a digital TDM multiplexer or some remote robotic machinery with a specialized protocol or the transmission signal for a wide area network that uses the viral molecular network as a pure transmission connection between two fixed points. The third interface to the end user application is what is called Native applications, whereby the end users' application uses Application Programmable Interface (AAPI) 201C which is socket directly into the viral molecular network cell frame formation by its cell framing and switching system 201. These three types of application can only enter the viral molecular network through Viral Orbital Vehicle 200 ports.

The next layer of the viral molecular network architecture is the cell framing and switching 200 which encapsulates the end user application information into cell formatted frames and assign each frame a source and destination header for effective cell switching throughout the network, The cell frames are then placed into orbital time slots 214 by the ASM 212. The packaging of the end user application information into cell frames are all carried out in the Viral Orbital Vehicle. The next level of the viral molecular network architecture is the Protonic Switch 300 which connects to 400 Viral Orbital Vehicles in an atomic molecular domain design, whereby each Viral Orbital Vehicle is adopted by a parent Protonic Switch once that Viral Orbital Vehicle is turned on and enters the Viral Molecular network theater. The Protonic Switches are connected to Nucleus Switches 400 which act as the hubs for the network in a city, between cities and countries. The Viral Orbital Vehicle, Protonic Switch, and Nucleus Switch are connected to by wireless radio frequency (RF) transmission system 220A, 328A, and 432A.

Figure 2:
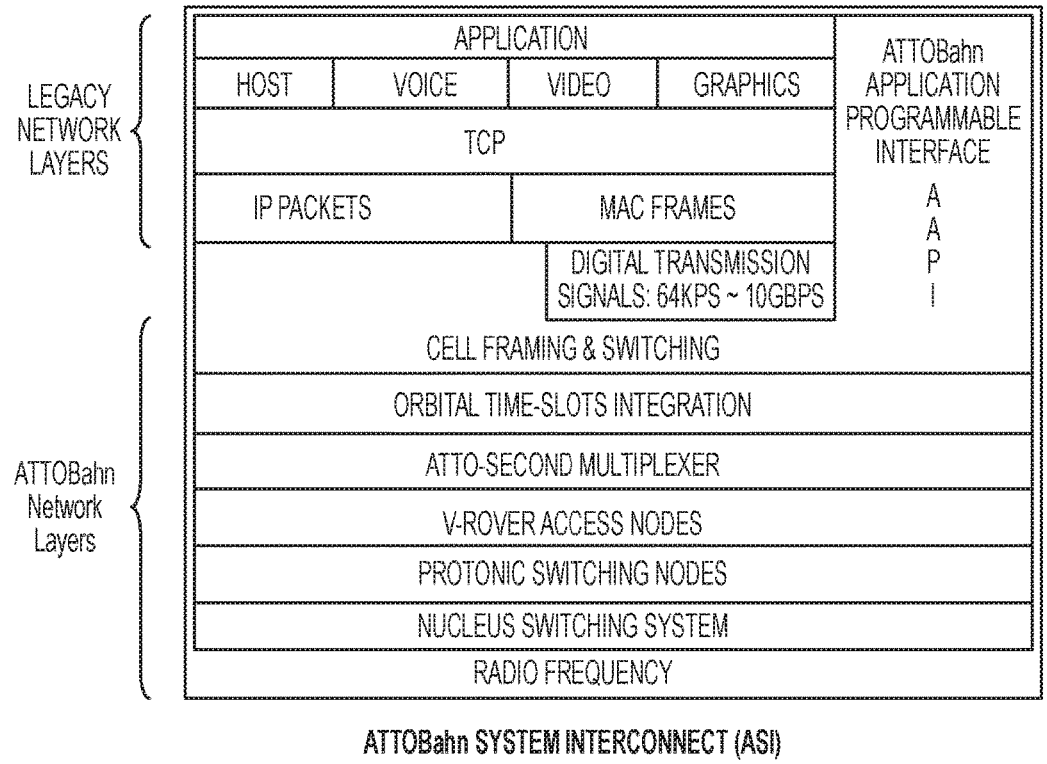
FIG. 2.0 is a block diagram of that shows the standard Internet Transmission Control (TCP)/Internet Protocol (IP) suite.
Figure 2:
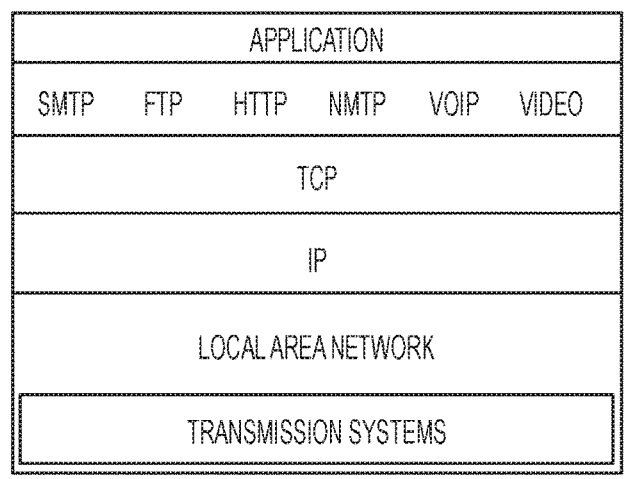

As an embodiment of this invention FIG. 2.0 shows the comparison between the standard TCP/IP protocol suite that is currently used in the Internet compared to the Viral Molecular network communications suite 100. As shown, the suite is different from the Internet TCP/IP suite in the following manner: The viral molecular network does not use TCP, IP, or MAC protocols.

1. the viral molecular network uses a API 201C to interface native applications information
2. the viral molecular network uses a cell framing format and switching 201.
3. the viral molecular network utilizes Orbital Time Slots (OTS) 214 and ultra-high speed Atto Second Multiplexing 212 technique to multiplex the cell frames into a very high speed aggregated digital stream for transmission over the RF transmission system 220A, 328A, and 432A.
4. the viral molecular network uses a Viral Orbital Vehicle 200 which houses its AAPI 201C; cell framing and switching functionality 201; Orbital Time Slots (OTS) 214, ASM 212, and RF transmission system 220A, 328A, and 432A as its access node to interface customers devices and systems; In contrast the Internet uses Local Area Network switches based on MAC frames layer encapsulation of the customer data.
5. the viral molecular network does cell switching and the Internet does IP routing.
6. The Internet uses IP routers as the connectivity nodal device and in contrast the viral molecular network uses a Protonic Switch 300 using cell framing and switching and atomic molecular domain adoption of all Viral Orbital Vehicles in its operational domain.
7. the viral molecular network uses a Nucleus Switch 400 using a cell framing and switching. In contrast, the Internet uses core backbone routers.

Figure 3A:
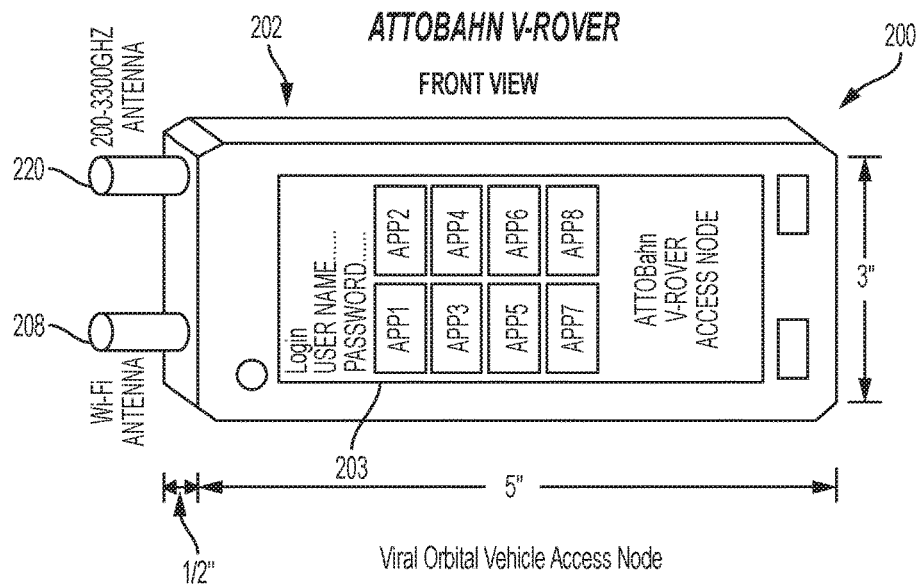
FIG. 3A is an illustration of the Viral Orbital Vehicle access node communications device housing front and non-connector ports side views which is an embodiment of the invention.
Figure 3B:
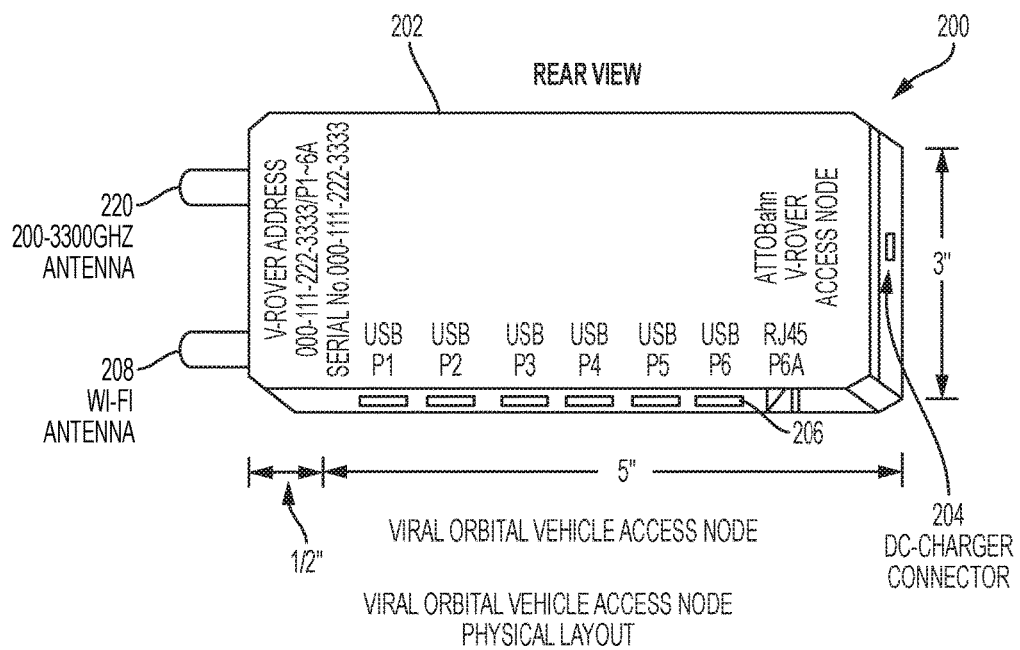
FIG. 3B is an illustration of the Viral Orbital Vehicle access node communications device housing rear, connector ports side, and the DC power connector bottom views which is an embodiment of the invention.

As an embodiment of this invention FIGS. 3A and 3B shows the Viral Orbital Vehicle communications device 200 that has a physical dimension of 5 inches long, 3 inches wide, and ½ inch high. The device has a hard durable plastic cover chasing 202 with a glass display screen 203 on the front of the device. The device is equipped with a minimum of 6 physical ports 206 that can accept high speed data streams, ranging from 64 Kbps to 10 GBps from Local Area Network (LAN) interfaces which is not limited to a USB port, and can be a high-definition multimedia interface (HDMI) port, an Ethernet port, a RJ11 modular connector, an IEEE 1394 interface (also known as FireWire) and/or a short-range communication ports such as a Bluetooth, Zigbee, near field communication, or infrared interface that carries TCP/IP packets or data streams from the Application Programmable Interface (AAPI); Voice Over IP (VOIP), or video IP packets.

The Viral Orbital Vehicle device has a DC power port 204 for a charger cable to allow charging of the battery in the device. The device is designed with high frequency RF antenna 220 that allows the reception and transmission of frequencies in the range of 200 to 3300 GHz. In order to allow communications with Wi-Fi_33, Bluetooth, and other lower frequencies system, the device has a second antenna 208 for the reception and transmission of those signals.

Figure 4:
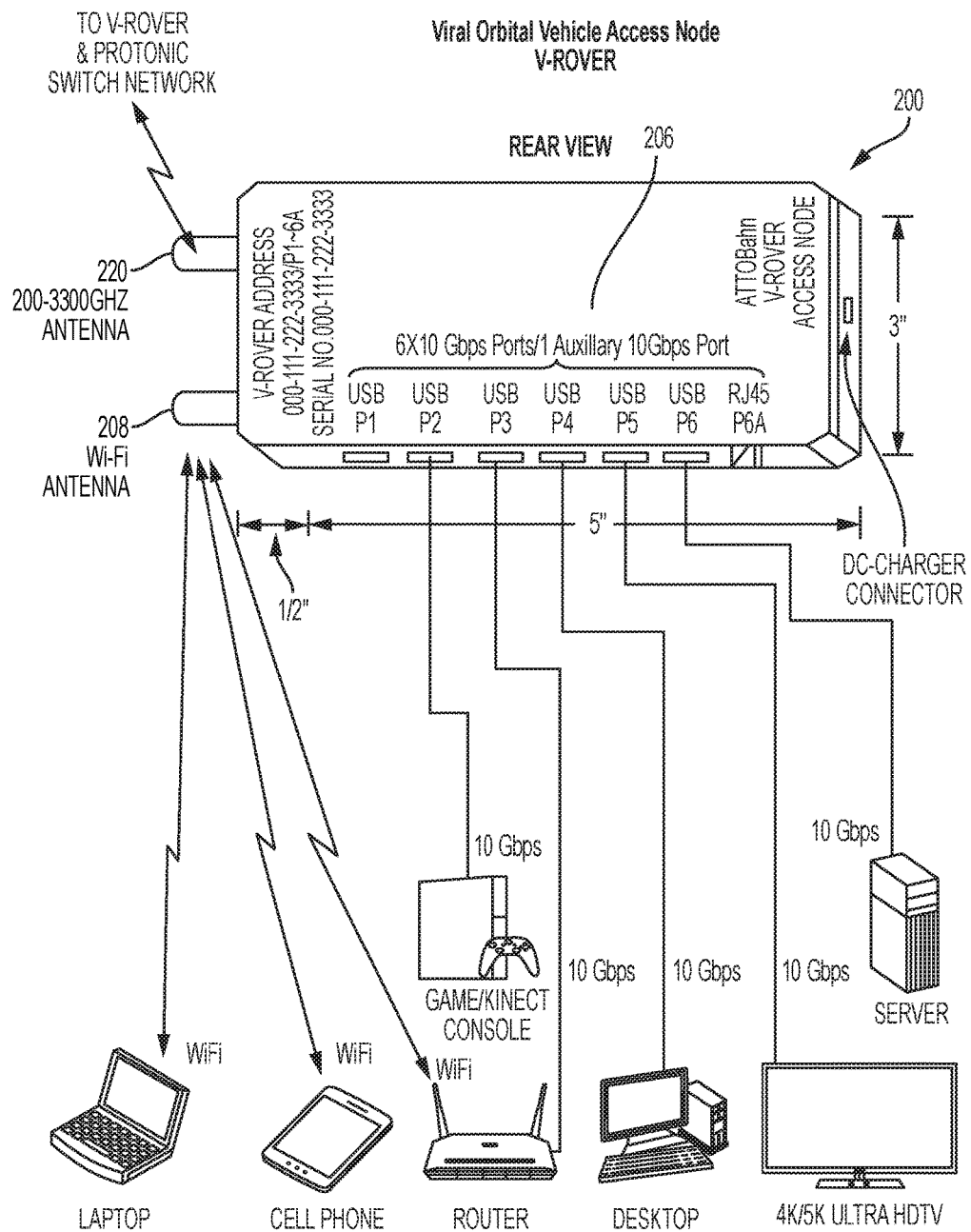
FIG. 4.0 shows the Viral Orbital Vehicle access node communications device housing rear, connector ports side, and the DC power connector bottom views with the device connected to a series of typical end user systems which is an embodiment of the invention.

As an embodiment of this invention FIG. 4.0 shows the physical connectivity between the Viral Orbital Vehicle device ports 206; Wi-Fi_33, Bluetooth, and other lower frequencies antenna 208; and the high frequency RF antenna 220 and 1) end user devices and systems but not limited to laptops, cell phones, routers, kinetic system, game consoles, desktop PCs, LAN switches, servers, 4K/5K ultra high definition TVs, etc.; 2) and to the Protonic Switch.

Figure 5:
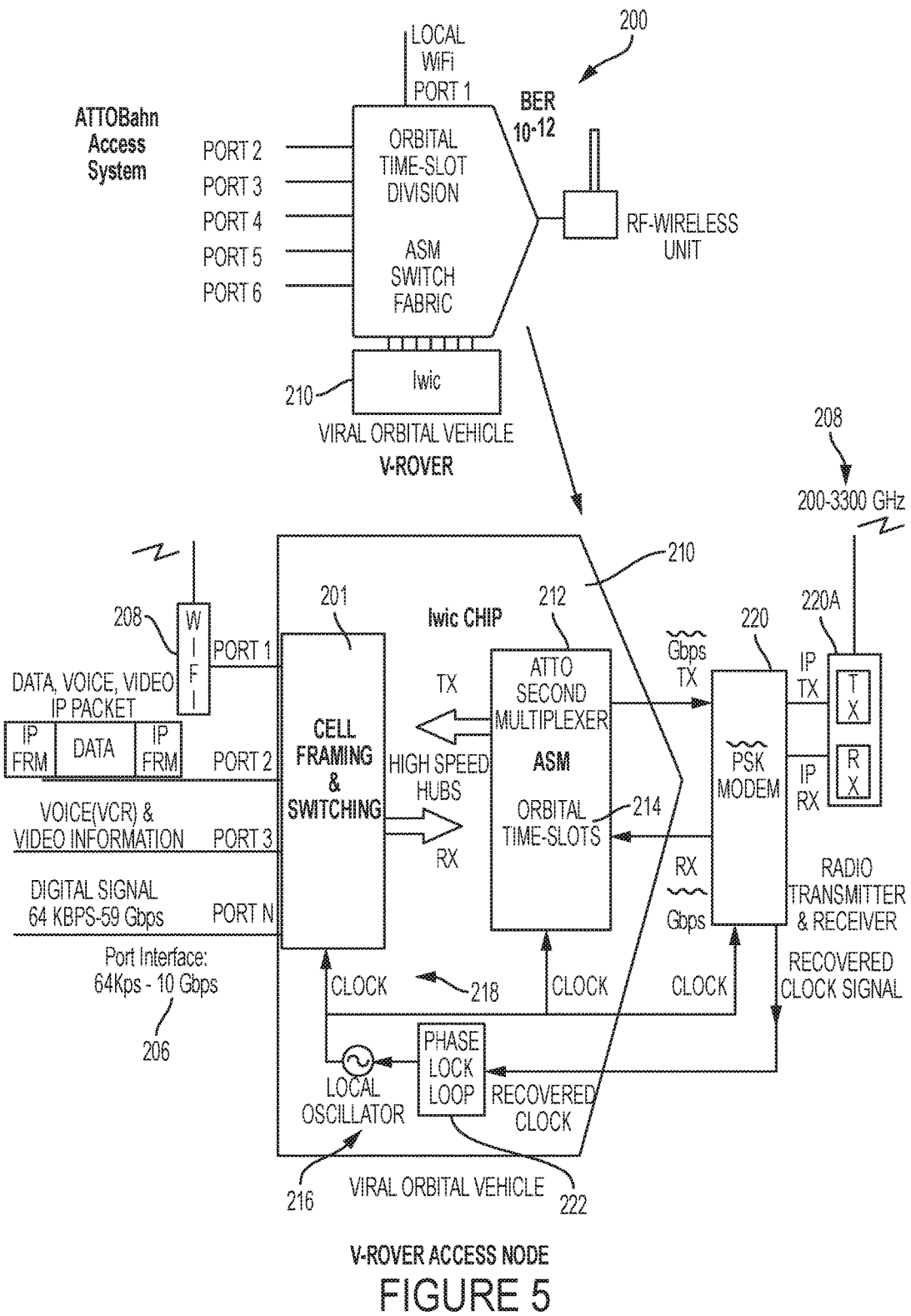
FIG. 5.0 is a series of block diagrams that illustrates the internal operations of the Viral Orbital Vehicle access node communications device on end user information and digital streams which is an embodiment of this invention.

As an embodiment of the invention FIG. 5.0 show the internal operations of the Viral Orbital Vehicle communications devices 200 with. The end user data, voice, and video signals enters the device ports 206 and low frequency antenna (Wi-Fi_33, Bluetooth, etc.) 208 and are clock into the cell framing and switching system using the highly stabilized clocking system 218 with its internal oscillator 216 and phase lock loop 222 that is referenced to the recovered clocking signal obtained from the demodulator section of the modem 220 received digital stream. Once the end user information is clock into the cell framing system, it is encapsulated into the viral molecular network cell framing format, where a source and destination ports 13 digit number schema address headers, using a nibble of 4 bytes per digit are inserted in the cell frame 7 byte header. The end user information stream in broken into 60 bytes payloads cells which are accompanied with their 7 byte headers.

The cell frames are placed onto the Viral Orbital Vehicle high speed buss and delivered to the cell switching section of the Iwic Chip 210 where the cell is switched sent via the high speed to the ASM 212 and placed into a specific Orbital Time Slot (OTS) 214 for transport to the Protonic Switch or one of its neighboring Viral Orbital Vehicle if the traffic is staying local within the atomic molecular domain After the cell frames passes through the ASM, they are submitted to the 16 bit Differential Phase Shift Key modulator of the modem 220. The ASM develops four high speed digital streams that are sent to the modem and after individually modulating each digital stream into four intermediate frequency (IF) signals. The four IFs are sent the RF system 220A mixer stage where the IF frequencies are mixed with their RF carriers (four RF carriers per Viral Orbital Vehicle device) and transmitted over the antenna 208.

Figure 5A:
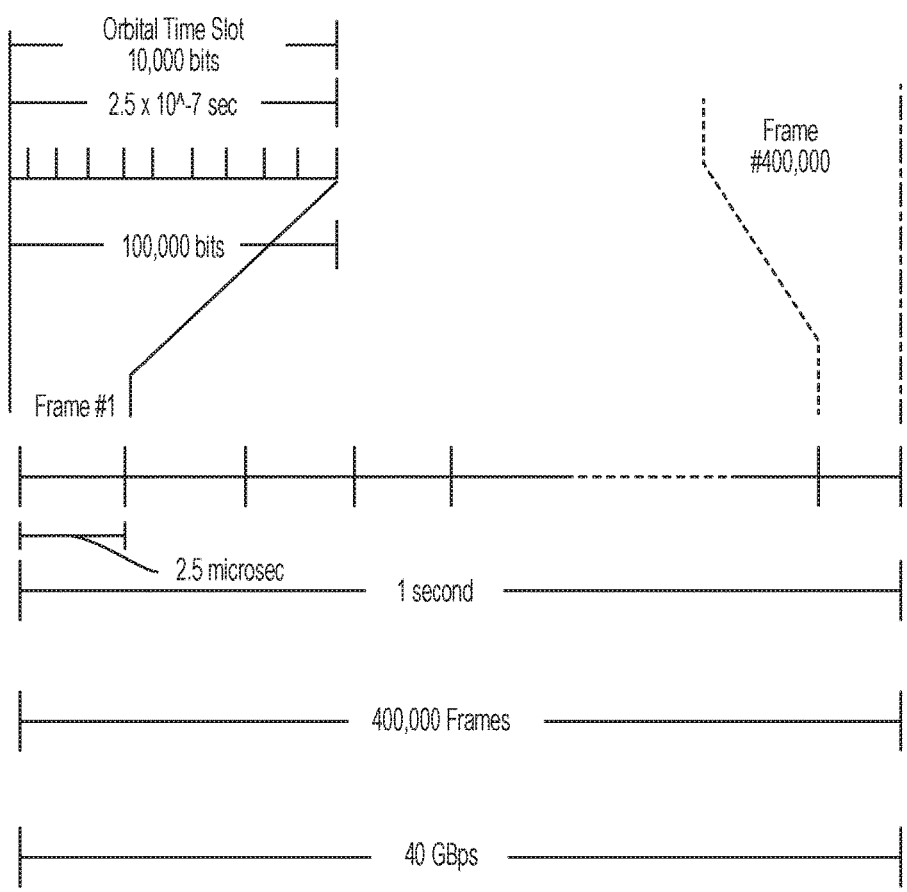

As an embodiment of the invention FIG. 5A illustrates the ASM 212 framing format that consist developing Orbital Time Slots (OTS) 214 of 0.25 micro second that moves 10,000 bits within that time period. Ten (10) OTS 214 A frames of 0.25 micro-second makes up one ASM frame with an orbital period of 2.5 micro second. The ASM circuitry moves 400,000 ASM frames 212A per second. The OTS 10,000 bits every 0.25 micro-seconds results in 40 Gbps. This framing format is developed in the Viral Orbital Vehicle, Protonic Switch, and the Nucleus Switch across the Viral Molecular network.

Figure 6:
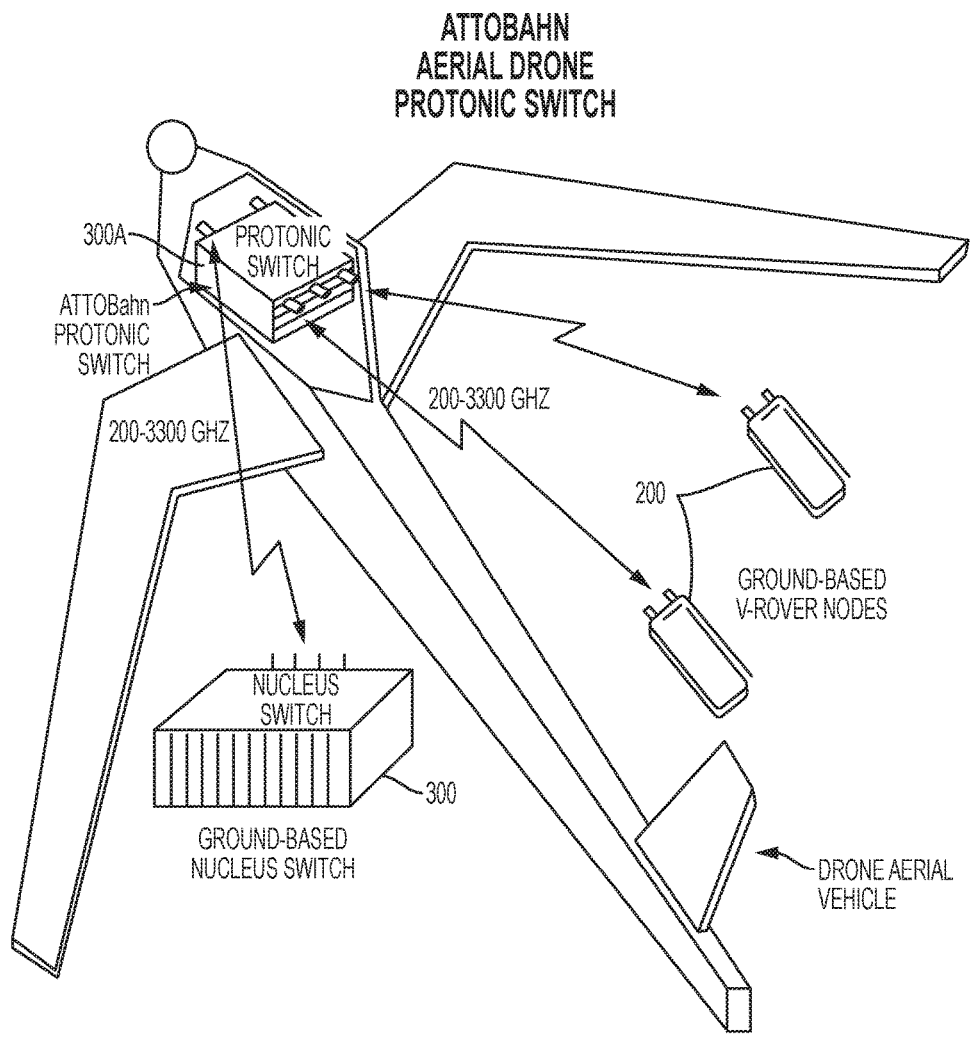
FIG. 6.0 illustrates the Protonic Switch communications device installed in an aerial drone aircraft providing one of the Protonic Switching Layer mobile extensions which is an embodiment of this invention.

As an embodiment of the invention FIG. 6.0 show the layout of the Protonic Switch aerial drone design 300A. The Protonic switch are installed in the drone 300C and is designed to operate at altitudes exceeding 70,000 feet and temperatures at −80 degree F. The Protonic Switch uses power from the drone's solar power cells and transmits RF power to cover over 20 miles to its closest ground based Nucleus Switch 400 or paired ground based Protonic Switches 300B to relay the high speed switch cell frames. The drone Protonic Switch receives four RF signals from its ground based two paired Protonic Switches and Nucleus Switch. The RF signals are demodulated by the 16 bit DPSK modem and passed on to the ASM OTS where the cell frames sent to the high speed cell switching circuitry. The switched cells are interleaved into OTS and subsequently sent back to the ground based Protonic and Nucleus Switches.

Figure 7:
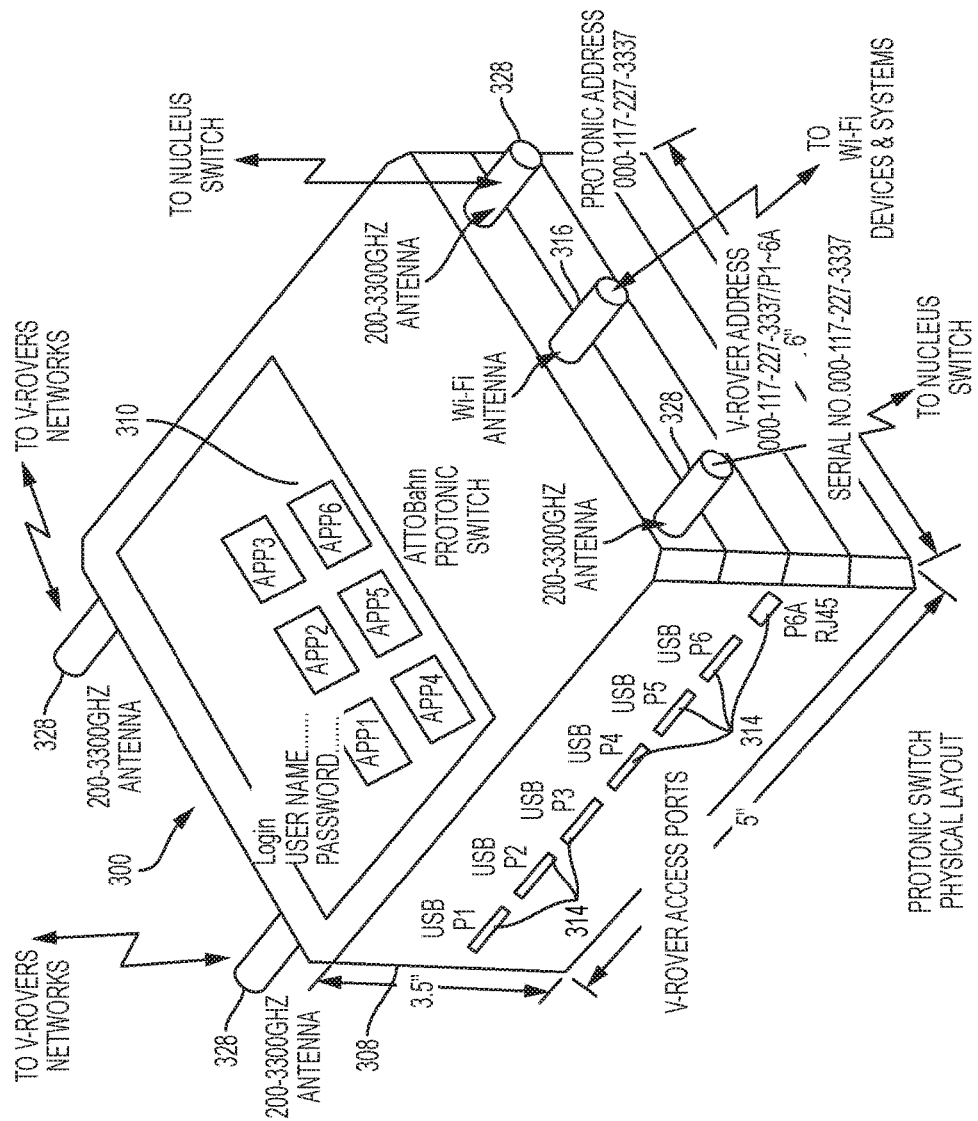
FIG. 7.0 is a block diagram that illustrates the Protonic Switch communications device housing front view, connector ports side view, and one of the non-connector ports views physical connections to typical end users system which is an embodiment of this invention.
Figure 7A:
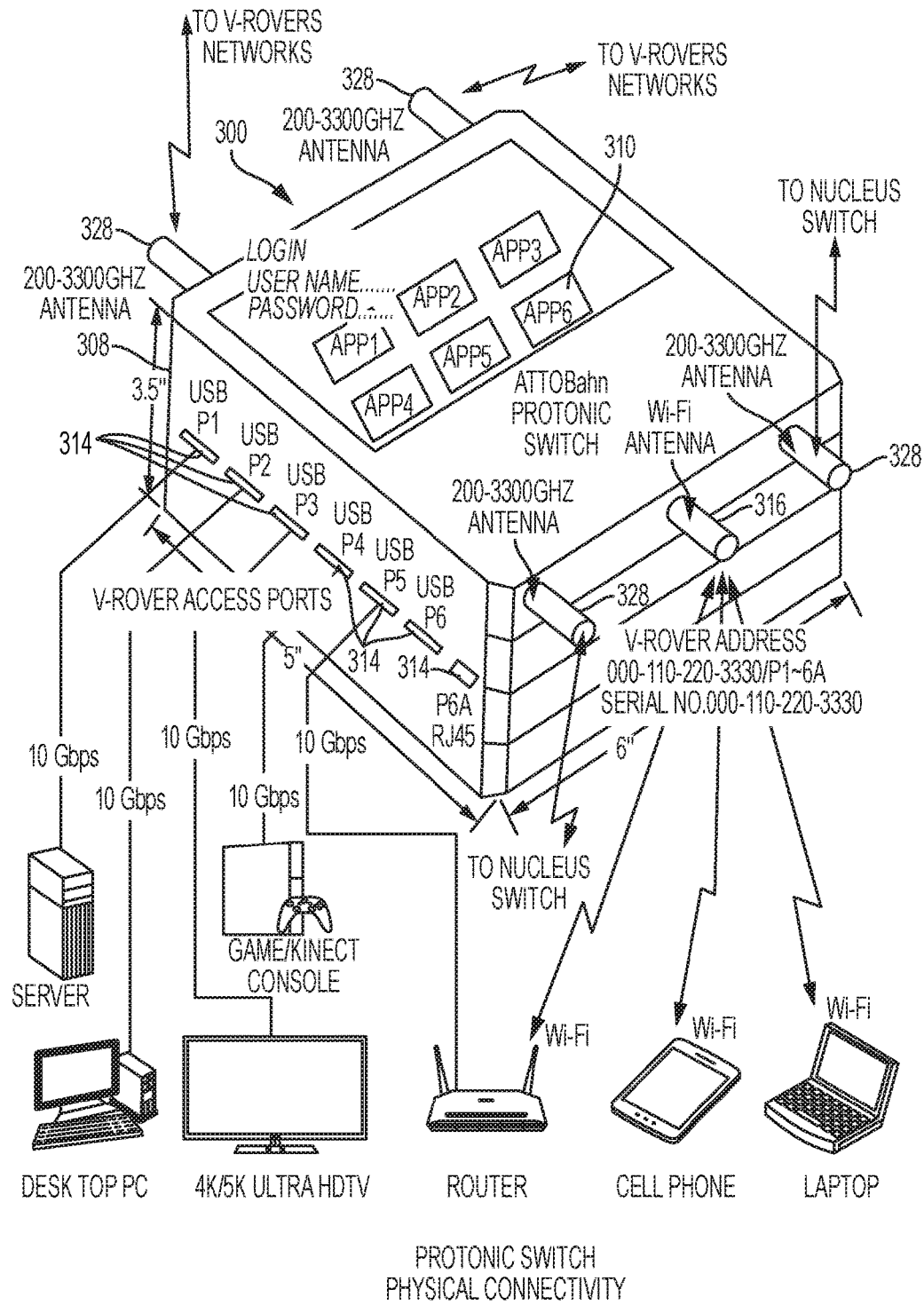

As an embodiment of the invention FIG. 7.0 shows the Protonic Switch communications unit 300. The unit has four antennae for the reception and transmission of RF signal in the 200 to 3300 GHz range and one antenna 316 for reception and transmission Wi-Fi_33, Bluetooth and other lower frequencies. The unit has one built in Viral Orbital Vehicle device to allow end users who has the device in their home, vehicle, or within close proximity to have access to the viral molecular network. In order to connect end users to internal Viral Orbital Vehicle, the unit housing is equipped with a minimum of 6 physical ports 314 that can accept high speed data streams, ranging from 64 Kbps to 10 GBps from Local Area Network (LAN) interfaces which is not limited to a USB port, and can be a high-definition multimedia interface (HDMI) port, an Ethernet port, a RJ11 modular connector, an IEEE 1394 interface (also known as FireWire) and/or a short-range communication ports such as a Bluetooth, Zigbee, near field communication, or infrared interface that carries TCP/IP packets or data streams from the Application Programmable Interface (AAPI); Voice Over IP (VOIP), or video IP packets.

The unit has a front glass panel LCD display 310 that provides configuration and troubleshooting access for the end user. The housing case 308 is 6 inches long, 5 inches wide, and 3.5 inches high. The unit is design to be place in vehicles, homes, aerial drones, cafes, offices, desktops, table tops, etc. The unit has a DC power connector for the DC power plug that charges the internal battery.

Figure 8:
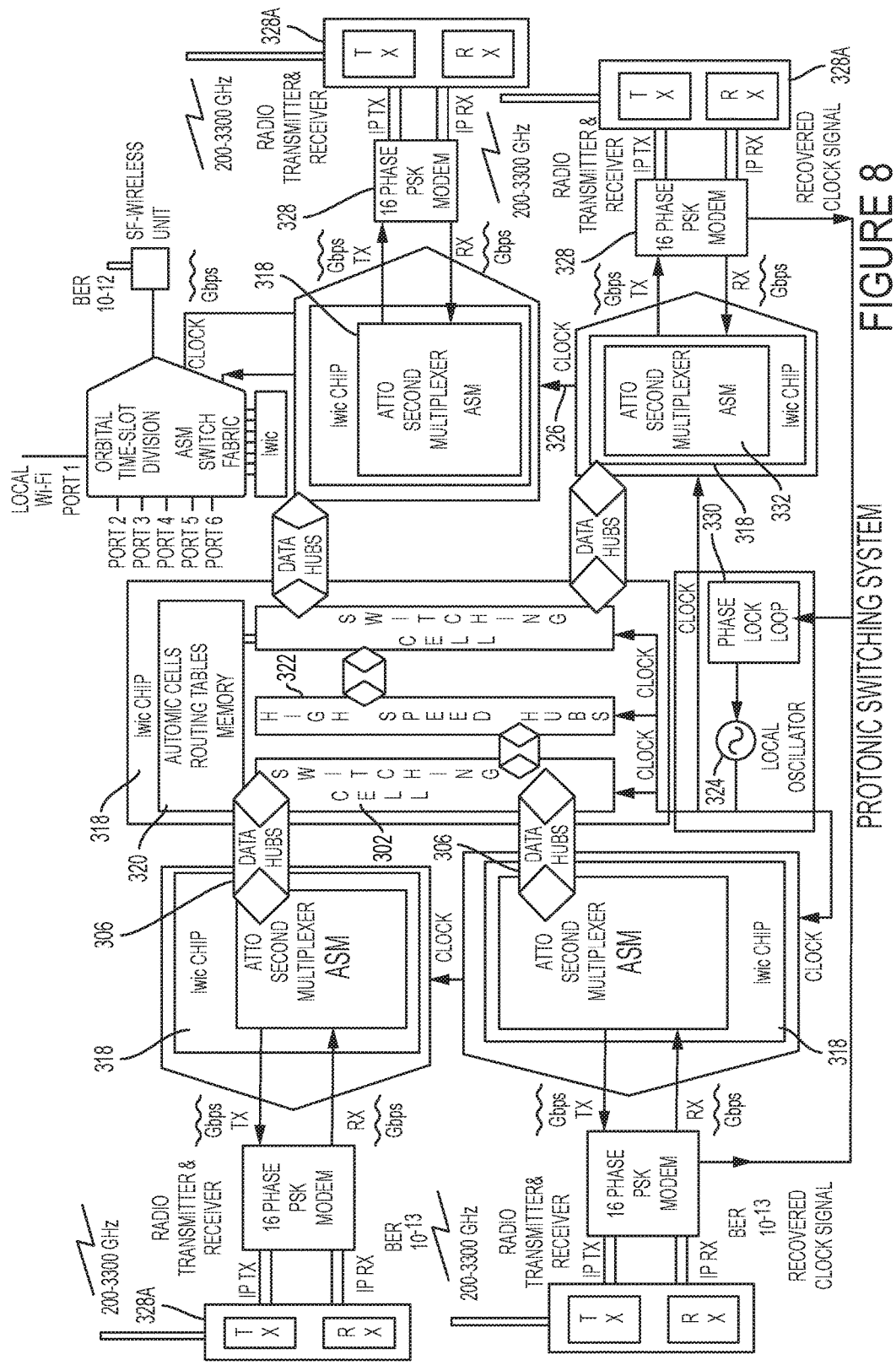
FIG. 8.0 shows the Protonic Switch communication device housing displaying the physical connectivity to typical end users PCs, Laptops, game console and kinetic system, servers, etc.

As an embodiment of the invention FIG. 8.0 shows the end user physical connections to the Protonic Switch internal Viral Orbital Vehicle. The ports 314 of the unit can connects to desktop PC, game console/kinetic, server, 4K/5K ultra high definition TVs, digital HDTV, etc. The Protonic Switch lower frequency antenna 316 provides Wi-Fi_33, Bluetooth, wireless connections to routers, cell phones, laptops, and numerous wireless devices.

Figure 9:
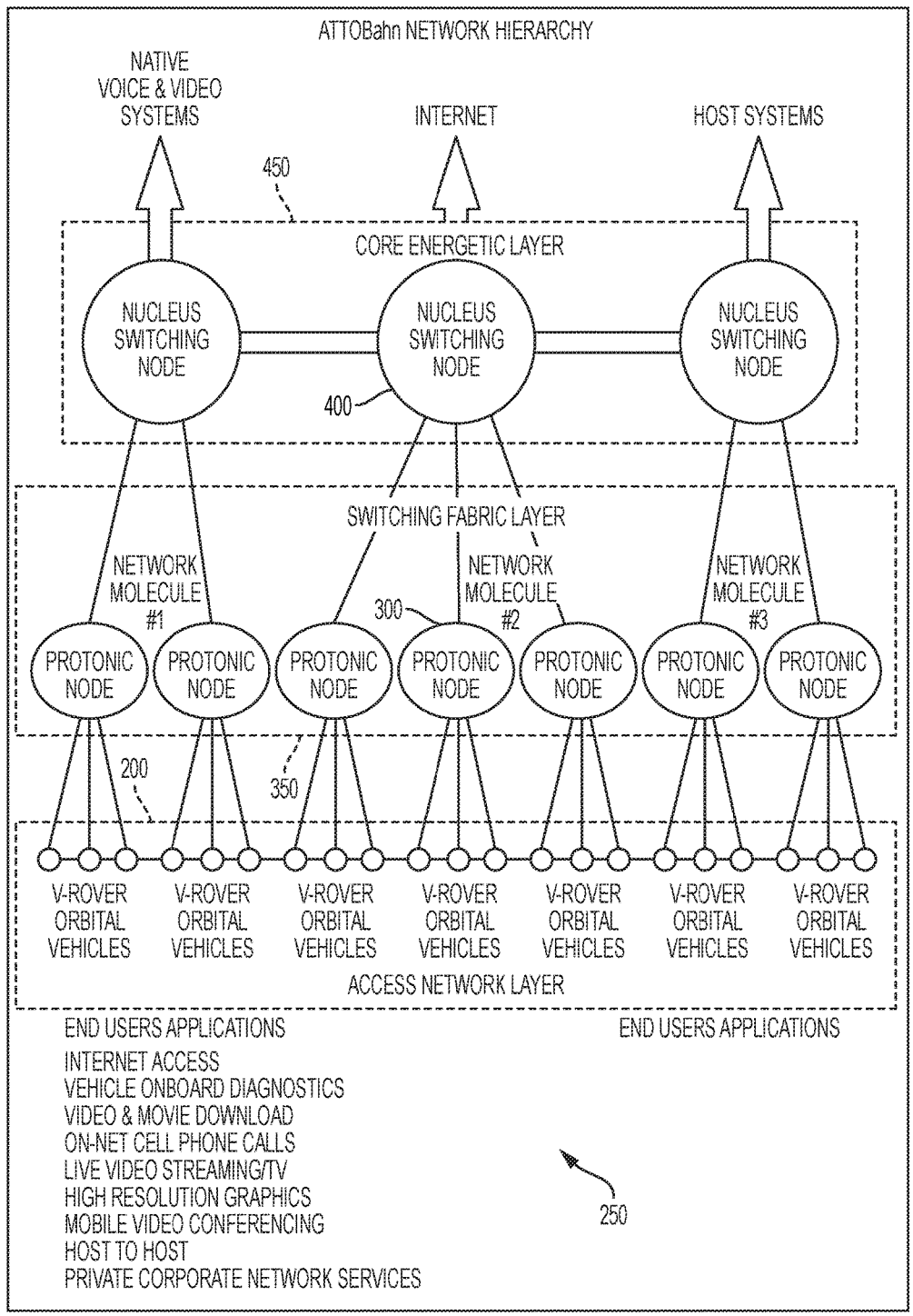
FIG. 9.0 is a series of block diagrams that illustrates the internal operations of the Protonic Switch communications device on end user information and digital streams which is an embodiment of this invention.

As an embodiment of the invention FIG. 9.0 displays the internal operations of the Protonic Switch 300. The Protonic Switch is positioned, installed, and placed in: homes; cafes such as Starbucks, Panera Bread, etc.; vehicles (cars, trucks, RVs, etc.); school classrooms and communications closets; a person's pocket or pocket books; corporate offices communications rooms, workers desktops; aerial drones or balloons; data centers, cloud computing locations, Common Carriers, ISPs, news TV broadcast stations; etc.

The PSL switching fabric consists of a core cell switching node 302 surrounded by four ASM multiplexers 332 running four individual 16 bit DPSK modems 328 and associated RF system 328A. The Four ASM/16 Phase Modems/RF systems drives a total bandwidth of 16×40 GBps digital steams, adding up to a high capacity digital switching system with an enormous bandwidth of 0.64 Terabits per second (0.64 TBps) or 640,000,000,000 bits per second. The core of the cell switching fabric consists of several high speed buss 306 that accommodate the passage of the data from the ASM orbital time-slots and place them in the queue to read the cell frames destination identifiers by the cell processor. The cells that came in from the Viral Orbital Vehicles are automatically switched to the time-slots that are connected to the Nucleus Switching hubs at the central switching nodes in the core backbone network. This arrangement of not looking up routing tables for the Viral Orbital Vehicle cells that transit the Protonic Switches radically reduces latency through the protonic nodes. This helps to improve the overall network performance and increases data throughput across the infrastructure. The ASM and cell switching high speed capabilities are provided by the Instinctively Wise Integrated Circuit (Iwic) chip 318. The Iwic, high speed buss, and modem use the clocking signal 326 generated by the internal oscillator 324. The clocking stability is obtained from clock recovered signal from the received digital stream from the modem which controls the Phase Lock Loop device 330 that subsequently stabilizes the oscillator output clocking signal. Since the received digital signal from the Protonic Switch comes from the digital stream from the Nucleus Switch from the communications hub which is synchronized to the master clocking system that is referenced to the Global Position System.

The hierarchical design of the network whereby the Viral Orbital Vehicles do communicate only with each other and the Protonic nodes simplifies the network switching processes and allows a simply algorithm to accommodate the switching between Viral Orbital Vehicles and between the Protonic nodes and their acquired orbiting Viral Orbital Vehicles. The Hierarchical design also allows the Protonic nodes to switch cells only between the Viral Orbital Vehicles and the Nucleus Switching nodes. Protonic nodes do not switch cells between each other. The cell switching tables 320 in the Protonic nodes memory only carries their acquired Viral Orbital Vehicles designation ports that keep tracks of these Viral Orbital Vehicles orbital status, when they are on and acquired by the node. The Protonic node reads the incoming cells from the Nucleus nodes, looks up the atomic cells routing tables, and then insert them into the orbital time-slots in the ASM that is connected to that designation Viral Orbital Vehicle where the cell terminates.

The network is architected at the PSL to allow viral behavior of the Viral Orbital Vehicles not just when they are being adopted by a Protonic Switch but also when they lose that adoption due to a failure of a protonic switch. When a protonic switch is turned off or its battery dies, or a component fails in the device, all of the Viral Orbital Vehicles that were orbiting that switch as they primary adopter are automatically adopted to their secondary Protonic Switch. The orbital Viral Orbital Vehicles traffic is switched to their new adopter instantaneously and the service continues to function normally. Any loss of data during the ultra-fast adoption transition of the Viral Orbital Vehicles between the failed primary Protonic Switch and the secondary Protonic Switch is compensated at the end user terminating host or digital buffers in the case of native voice or video signals.

The Viral Orbital Vehicles play a critical role along with the Protonic Switches is network recover due to failures. The Viral Orbital Vehicles immediately recognizes when its primary adopter fails or go offline and instantaneously switches all upstream and transitory data that using its primary adopter route to its secondary adopter other links. The Viral Orbital Vehicles that lost their primary adopter now makes their secondary adopter their primary adopter. These newly adopted Viral Orbital Vehicles then seek out a new secondary adopting Protonic Switch within their operating network molecule. This arrangement stays in place until another failure occurs to their primary adopter, then the same viral adoption process is initiated again.

Each Protonic Switching node is equipped with a Viral Orbital Vehicle for collecting local end user traffic so that the vehicle housing these switches are also given network access at this point. The locally attached Viral Orbital Vehicle is hard wired to one of the Protonic Switch's ASMs via a USB port. This is the only originating and terminating port that the PSL layer accommodates. All other PSL ports are purely transition port, that is, ports that transit traffic between the Access Network Layer (Viral Orbital Vehicles) and the Nucleus Switching Layer (Core Energetic Layer).

The local Viral Orbital Vehicle has a secondary radio frequency (RF) port that also connects it to the network molecule that it is located. This Viral Orbital Vehicle uses the local hard wired connected Protonic Switch (its closest) as its primary adopter and the adopter connected to its RF port as its secondary adopter. If the local Protonic Switch fails, then the local Viral Orbital Vehicle goes into the resilient adoption and network recovery process.

The Protonic Switches are equipped with a minimum of six external port interface for the local Viral Orbital Vehicle device end users connection. This internal Viral Orbital Vehicle runs at 40 GBps and transfers its data from the Viral Orbital Vehicle to the molecular network. The other interfaces of the switch is at the RF level running at 16×40 GBps across four 200-3300 GHz signals. This switch is basically self-contained and has all of digital signal movement across its ultra-high terabits per second buss that connects its switching fabric, ASMs, and 16-Phase PSK modulators.

Protonic Switch Clocking & Synchronization

The PSL is synchronized to the NSL and ANL systems using recovery-looped back clocking schema to the higher level standard oscillator. The standard oscillator is referenced to the GPS service worldwide, allowing clock stability.

This high level of clocking stability when distributed to the PSL level via the NSL system and radio links gives a clocking and synchronization stability.

The PSL nodes are all set for recovered clock from the Intermediate Frequency at the demodulator. The recovered clock signal controls the internal oscillator and reference its output digital signal which then drives the high speed buss, ASM gates and Iwic chip. This makes sure that all of the digital signal that are being switched and interleaved in the orbital time-slots of the ASM are precisely synchronized and thus reducing bit errors rate.

The Protonic switch is the second communications device of the Viral Molecular network and it has a housing that is equipped with a cell framing high speed switch The Protonic Switch includes the function of placing the 67 bytes cell frames into the application specific integrated circuit (ASIC) called the Iwic which stands for Instinctively Wise Integrated Circuit. The Iwic is the cell switching fabric of the Viral Orbital Vehicle, Protonic Switch, and Nucleus Switch. This chip operates in the terahertz frequency rates and it takes the cell frames that encapsulates the customers digital stream information and place them onto the high speed switching buss. The Protonic Switch has sixteen (16) parallel high speed switching busses. Each buss runs at 2 terabits per second (TBps) and the sixteen parallel busses move the customer digital stream encapsulated in the cell frames at combined digital speed of 32 Terabits per second (Tbps). The cell switch provides a 32 Tbps switching throughput between its Viral Orbital Vehicle connected to it and the Nucleus Switches.

The Protonic Switch housing has an Atto Second Multiplexing (ASM) circuitry that uses the Iwic chip to place the switched cell frames into orbital time slots (OTS) across sixteen digital streams running at 40 Gigabits per second (Gbps) each, providing an aggregate data rate of 640 Gbps. The ASM takes cell frames from the high speed busses of the cell switch and places them into orbital time slots of 0.25 micro seconds period, accommodating 10,000 bits per time slot (OTS). Ten of these orbital time slots makes one of the Atto Second Multiplexing (ASM) frames, therefore each ASM frame has 100,000 bits every 2.5 micro second. There are 400,000 ASM frames every second in each 40 Gbps digital stream. The ASM moves 640 Gbps via 16 digital streams to the intermediate frequency (IF) modem of the radio frequency section of the Protonic Switch.

In this embodiment the Protonic Switch has a radio frequency (RF) section that consist of four (4) quad intermediate frequency (IF) modems and RF transmitter/receiver with 15 RF signals. The IF modem is a 16 bit Differential Phase Shift Key (DPSK) that takes the 16 individual 40 Gbps digital streams from the ASM modulate them into an IF gigahertz frequency which is then mixed with one of the 16 RF carriers. The RF carriers is in the 200 to 3300 Gigahertz (GHz) range.

The Protonic Switch housing has an oscillator circuitry that generates all of the digital clocking signals for all of the circuitry that needs digital clocking signals to time their operation. These circuitry are the port interface drivers, high speed busses, ASM, IF modem and RF equipment. The oscillator is synchronized to the Global Positioning System by recovering the clocking signal from the received digital streams of the Protonic Switches. The oscillator has a phase lock loop circuitry that uses the recovered clock signal from the received digital stream and control the stability of the oscillator output digital signal.

Figure 10:
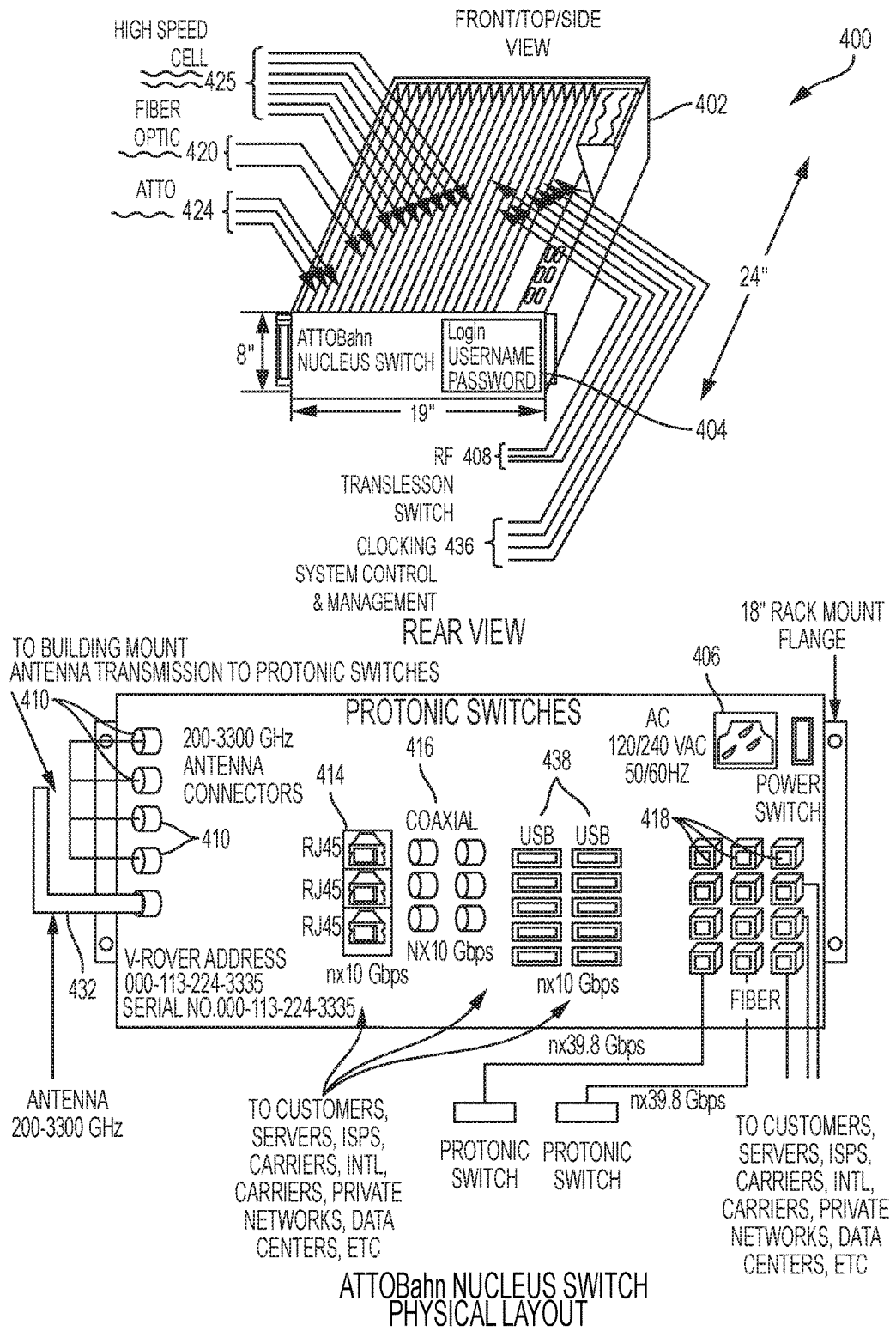
FIG. 10.0 shows the Viral Molecular network Access Network Layer (ANL), Protonic Switching Layer (PSL), and the Nucleus Switching Layer (NSL) hierarchy which is an embodiment of this invention.

As an embodiment of the invention FIG. 10.0 shows the Viral Molecular network Access Network Layer (ANL) 250, Protonic Switching Layer (PSL) 350, and the Nucleus Switching Layer (NSL) 450 hierarchy. The network is architected in these three layers that comprise of the Viral Orbital Vehicles 200, Protonic Switches 300, and Nucleus Switches 400 respectively to allow highly efficient switching of cell frames through the infrastructure by breaking the most congested part of the network, the ANL in small manageable domains called atomic molecular domains These domains are controlled by the Protonic Switch are called network molecules 360.

The ANL feeds its traffic to the PSL that manages all local traffic and keep that traffic local and makes sure that it does not go up to the NSL and waste bandwidth and cell switching resources at the NSL. Therefore any traffic from a Viral Orbital Vehicle that is destined for another Viral Orbital Vehicle in the same domain stay at the ANL by either going from Viral Orbital Vehicle to Viral Orbital Vehicle as shown at the 250 layer or traversing its adoptive Protonic Switch 300 to the destined Viral Orbital Vehicle in the same domain All traffic from a Viral Orbital Vehicle that is destined for another Viral Orbital Vehicle that is destined for the Internet or another Viral Orbital Vehicle in a distant must traverse the PSL and a Nucleus Switch at the NSL.

Figure 11:
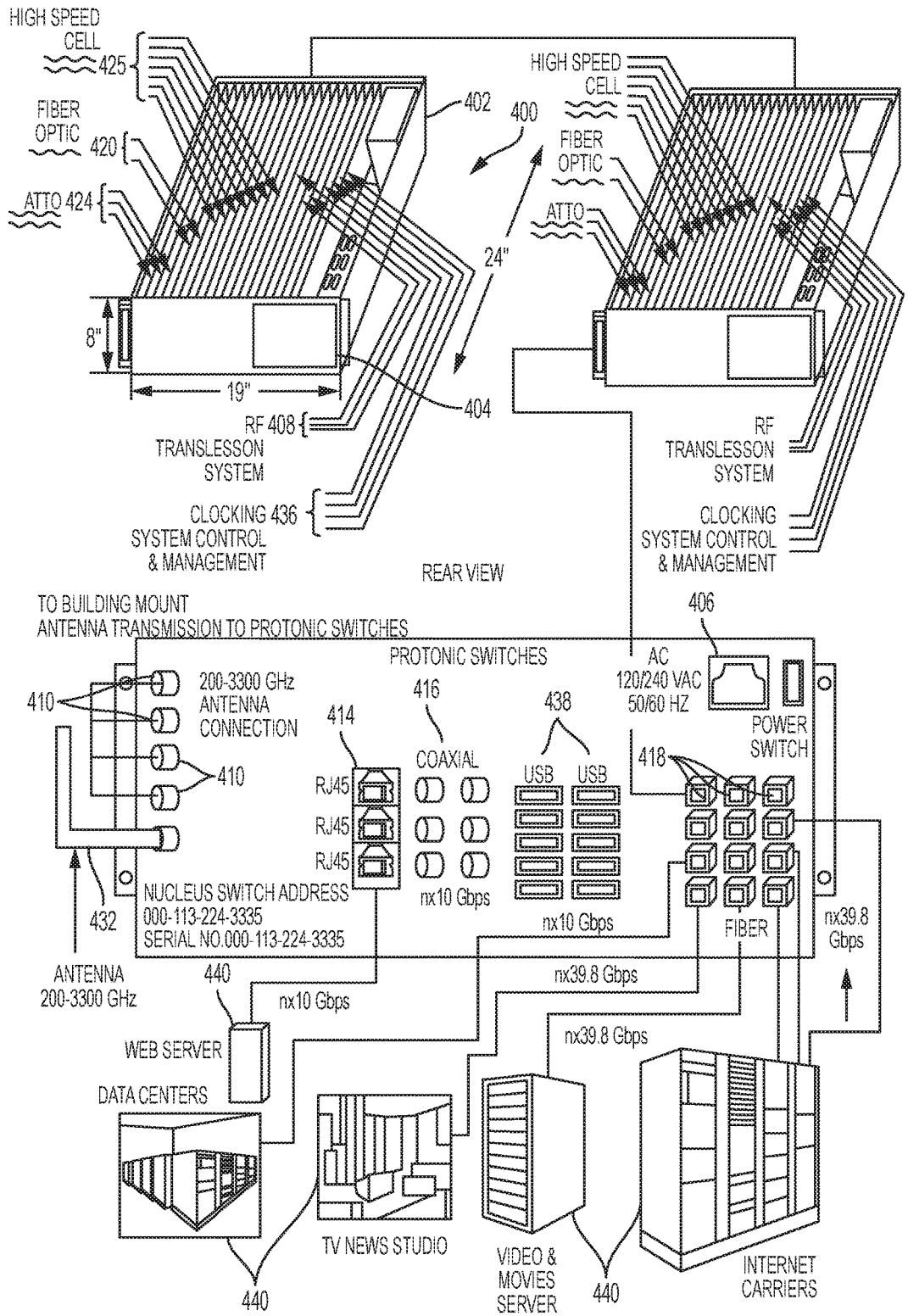
FIG. 11.0 displays the Nucleus switch housing front view, rear connector ports view, internal electronic card layouts view, and one of the non-connector side view which is an embodiment of this invention.

As an embodiment of the invention FIG. 11.0 displays the Nucleus Switch unit 400. The unit is house in a metal casing 402 on the sides, bottom and top with a hard plastic front panel that has a LCD display 404 for system configuration and onsite management. The unit is 24 inches long, 19 inches wide, and 8 inches high. The unit has a card cage that holds the Atto Second Multiplexers 424, the fiber optic terminals 420, the high speed cell switching fabric 425, RF transmission system 408 and the clocking and system control & management 436. The unit is designed to be shelf mounted using a screw flange or optionally the unit is designed to stand alone, wall mounted, or rest on a table or shelf.

The rear of the Nucleus Switch is configured with but not limited to RJ45 ports 414 that runs at digital speeds of n×10 GBps; coaxial ports 416 at digital speeds of n×10 GBps; USB ports 438 at digital speeds of n×10 GBps; fiber optics ports 418 at speeds of 10 Gbps to 768 Gbps; etc. The unit has five antenna port for the high frequency 200 to 3300 GHz RF signals. The unit use a standard 120 VAC electrical connector 406.

Figure 12:
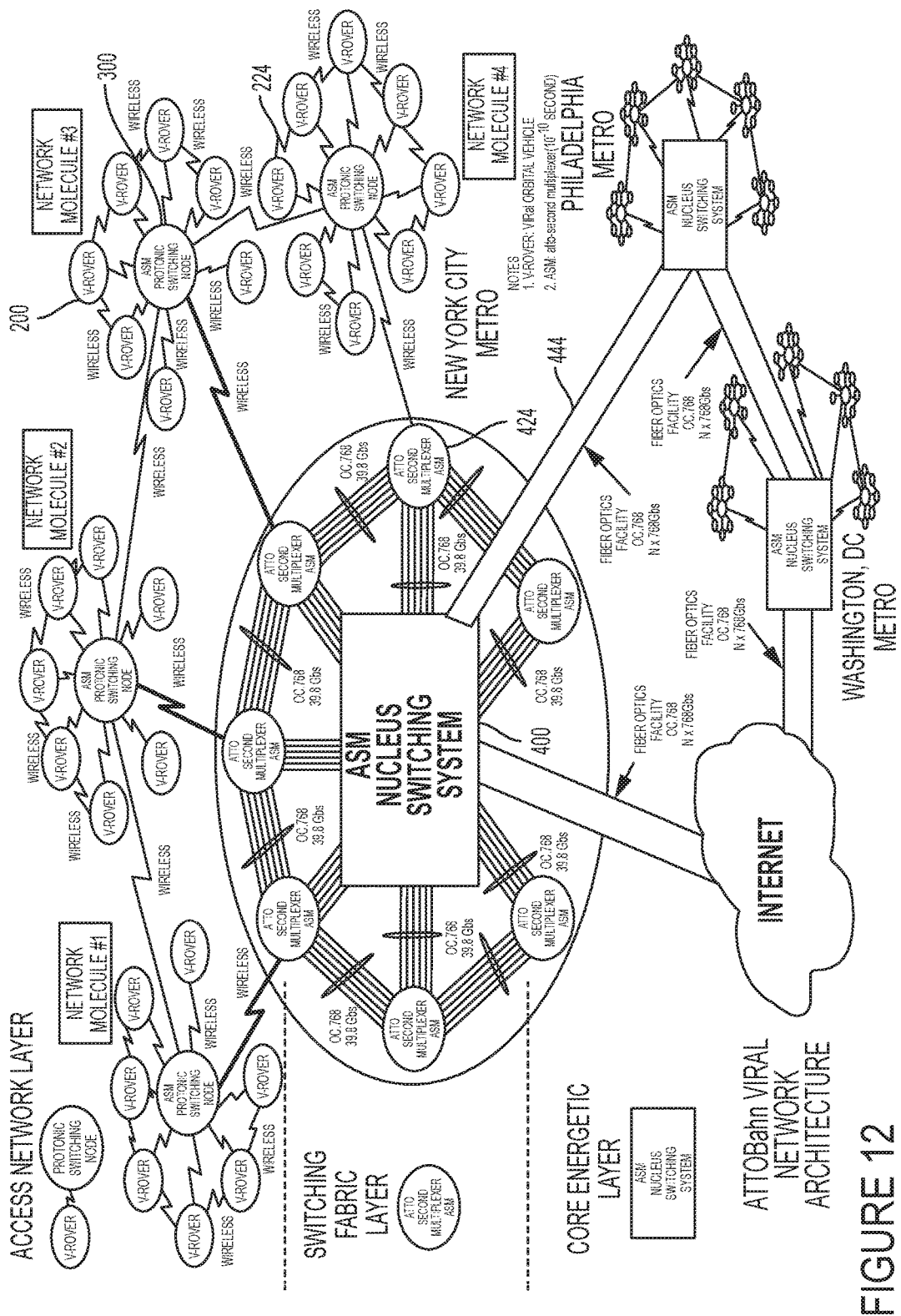
FIG. 12.0 illustrates the Nucleus Switch housing front view, rear connector ports view, internal electronic card layouts view, and one of the non-connector side view; the inter Nucleus Switch connectivity; and the typical physical connectivity to various end user devices and systems which is an embodiment of this invention.

As an embodiment of the invention FIG. 12.0 shows the Nucleus Switch unit 400 physical connectivity to end users systems 440. The Nucleus Switch is designed to connect directly but not limited to fiber optic ports running at 39.8 to 768 Gbps to connect to other viral molecular network intra city, intercity, and international Nucleus hub locations; high capacity corporate customers systems; Internet Service Providers; Inter-Exchange Carriers, Local Exchange Carriers; cloud computing systems; TV studio broadcast customers; 3D TV sporting event stadiums; movies streaming companies; real time movie distribution to cinemas; large content providers, etc.

Figure 13:
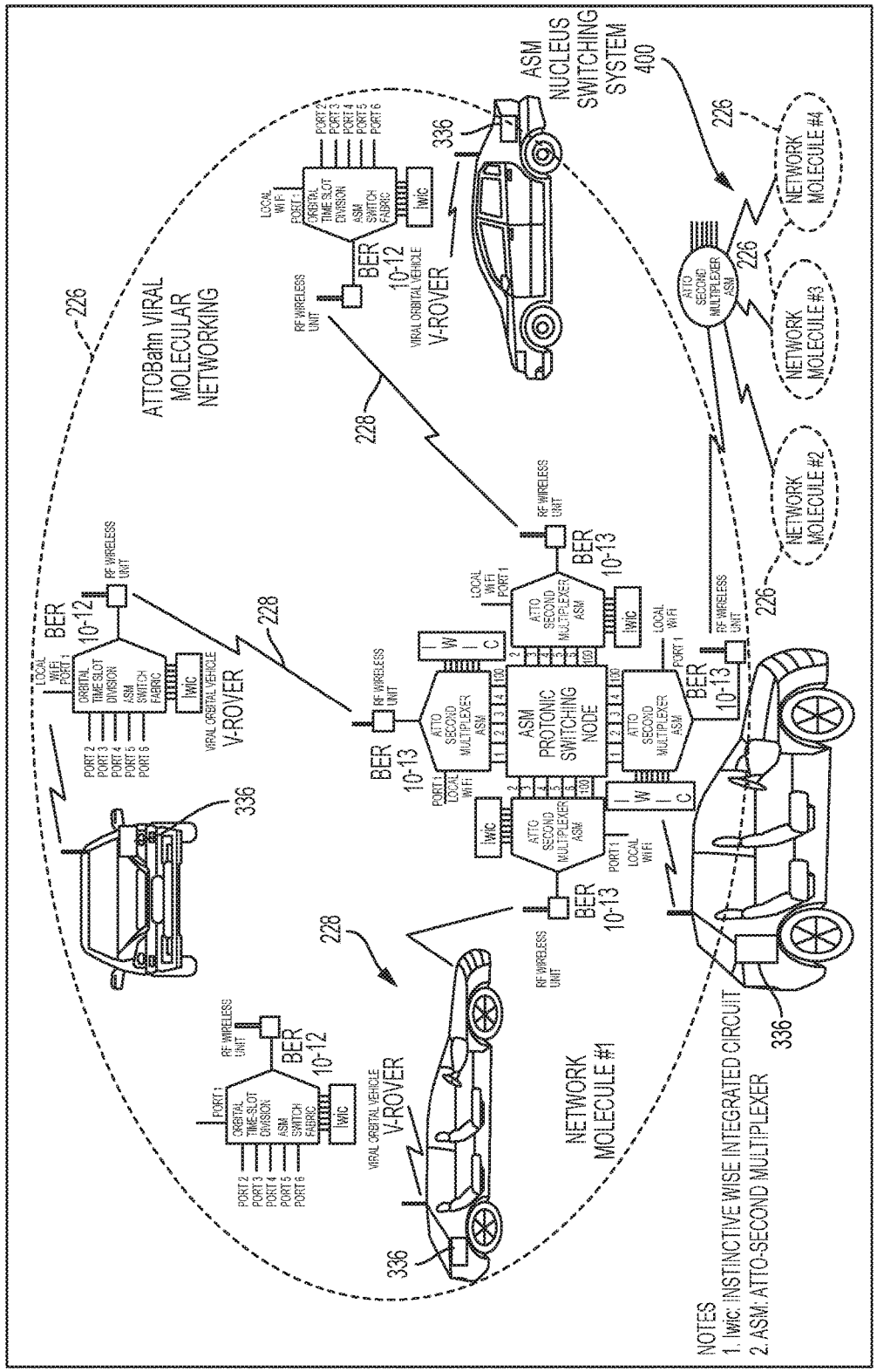
FIG. 13.0 shows the Viral Molecular network Protonic Switch and the Viral Orbital Vehicle access nodes atomic molecular domains inter connectivity and the Nucleus Switch/ASM hub networking connectivity which is part of this invention.

As an embodiment to the invention FIG. 13.0 shows the Viral Molecular network Protonic Switch and the Viral Orbital Vehicle access nodes atomic molecular domains inter connectivity and the Nucleus Switch/ASM hub networking connectivity.

FIG. 13.0 shows the high capacity backbone of the viral molecular network which is the Nucleus Switching Layer 450 that consists of the terabits per second Nucleus ASMs 424, ultra high speed switching fabrics, and broadband fiber optics SONET based intra and inter city facilities 444. This section of the network is the primary interface into the Internet, public local exchange and inter exchange common carriers, international carriers, corporate networks, content providers (TV, news, movies, etc.), and government agencies (nonmilitary).

The Nucleus Switches front end by ASMs that are connected to the Protonic Switches 300 via RF signals. The hub ASMs 424 acts as intermediary switches between the PSL 350 and the core backbone switches. These ASMs are equipped with a switching fabric that functions as a shield for the Nucleus Switches in keeping local intra city traffic from accessing them in order to eliminate inefficiencies, of using the Nucleus Switches to switch non-core backbone network traffic. This arrangement keeps local transitory traffic between the VIRAL ORBITAL VEHICLES nodes 200, the Protonic Switches, and the hub ASMs within the local ANL and PSL levels. The hub ASMs selects all traffic that are designated for the Internet, other cities outside the local area, host to host high speed data traffic, private corporate network information, native voice and video signals that are destined to specific end users systems, video and movie download request to content providers, on-net cell phone calls, 10 gigabit Ethernet LAN services, etc. FIG. 13.0 shows the ASM switching controls that keeps local traffic within the local Molecule Networks domains.

The Nucleus Switch device housing embodiment includes the function of placing the 67 bytes cell frames into the application specific integrated circuit (ASIC) called the Iwic which stands for Instinctively Wise Integrated Circuit. The Iwic is the cell switching fabric of the Viral Orbital Vehicle, Protonic Switch, and Nucleus Switch. This chip operates in the terahertz frequency rates and it takes the cell frames that encapsulates the customers digital stream information and place them onto the high speed switching buss. The Nucleus Switch has from 100 to 1000 parallel high speed switching busses depending on the amount of Nucleus Switches that are implemented at the Nucleus hub location. The Nucleus Switches are designed to be stacked together by inter connecting up to a maximum of 10 of them via their fiber optics ports to form a contiguous matrix of Nucleus Switches providing a maximum 1000 parallel busses×2 terabits per second (TBps) per buss. Each buss runs at 2 TBps) and the 1000 stacked parallel busses move the customer digital stream encapsulated in the cell frames at combined digital speed of 2000 Terabits per second (Tbps). The 10 stacked cell switch provides a 2000 Tbps switching throughput between its connected Proton Switches; other the viral molecular network intra city, intercity, and international Nucleus hub location; high capacity corporate customers systems; Internet Service Providers; Inter-Exchange Carriers, Local Exchange Carriers; cloud computing systems; TV studio broadcast customers; 3D TV sporting event stadiums; movies streaming companies; real time movie distribution to cinemas; large content providers, etc.

The Nucleus Switch housing has an Atto Second Multiplexing (ASM) circuitry that uses the Iwic chip to place the switched cell frames into orbital time slots (OTS) across sixteen digital streams running at 40 Gigabits per second (Gbps) each, providing an aggregate data rate of 640 Gbps. The ASM takes cell frames from the high speed busses of the cell switch and places them into orbital time slots of 0.25 micro seconds period, accommodating 10,000 bits per time slot (OTS). Ten of these orbital time slots makes one of the Atto Second Multiplexing (ASM) frames, therefore each ASM frame has 100,000 bits every 2.5 micro second. There are 400,000 ASM frames every second in each 40 Gbps digital stream. The ASM moves 640 Gbps via 16 digital streams to the intermediate frequency (IF) modem of the radio frequency section of the Protonic Switch.

Figure 14:
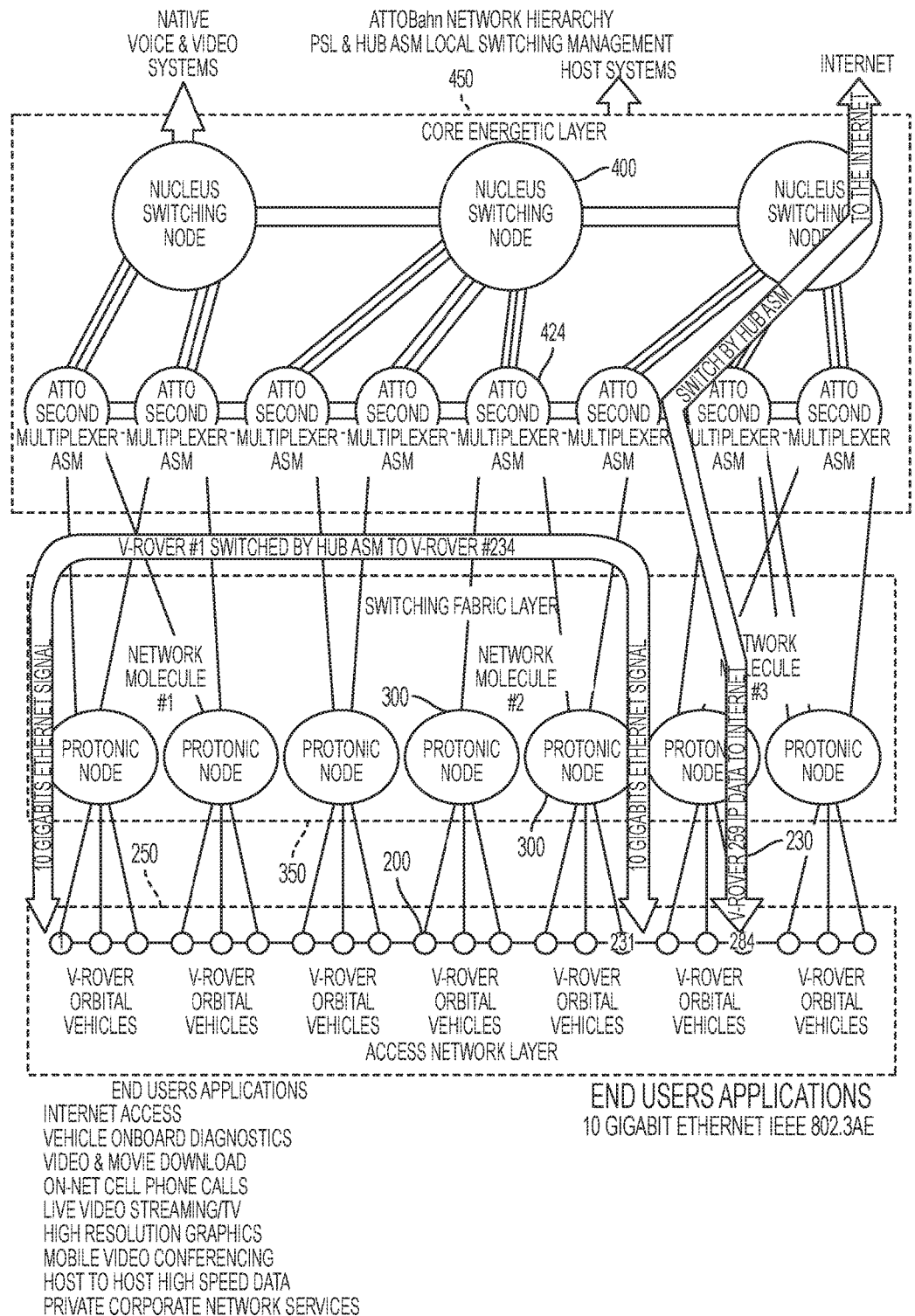
FIG. 14.0 illustrates the Viral Molecular network Protonic Switch vehicular implementation for the Protonic Switching Layer which is part of this invention.

As an embodiment of the invention FIG. 14.0 shows the Viral Molecular network Protonic Switch vehicular implementation for the Protonic Switching Layer. The Protonic Switch 300 is installed in cars, trucks, SUVs, fleets, etc. These switches 333 are in motion as the vehicles move and adopt various Viral Orbital Vehicles as they come into proximity of them. The connection links 228 between the Protonic Switch and Viral Orbital Vehicle constantly changes as these vehicles move through the city. The Viral Orbital Vehicles and the Protonic Switches are designed to function in this mobile environment with high quality data rates.

The ANL is separated into operational domains 226 called atomic molecular domains which consist of 4×400 Viral Orbital Vehicles to 4 Protonic Switches. The Protonic Switches from each domain connect via multi RF links to several Nucleus Switches via hub ASMs at the viral molecular network city hubs.

Figure 15:
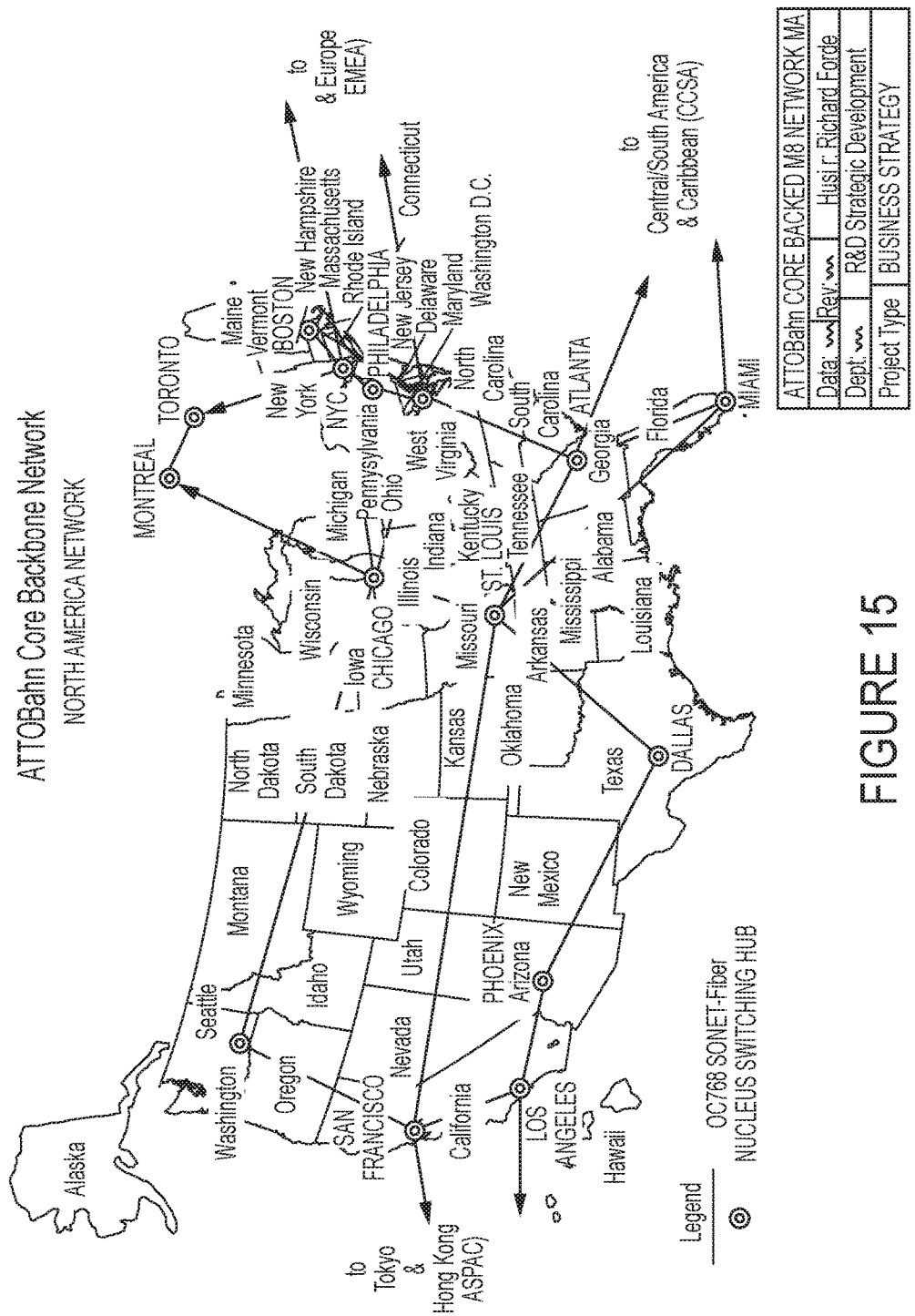
FIG. 15.0 display the Viral Molecular network Protonic Switching Layer and the hub ASMs switching management of local atomic molecular intra and inter domain and inter city traffic management which is an embodiment of this invention.

As an embodiment of the invention FIG. 15.0 the Viral Molecular network Protonic Switching Layer and the hub ASMs switching management of local atomic molecular intra and inter domain and inter city traffic management. The network layers allows Viral Orbital Vehicles 200 to switch traffic between each other via the Protonic Switch 300. The Viral Orbital Vehicle to Protonic Switch cell switching is accomplished by the Protonic Switch reading the cell frame destination address and deciding whether to send the cell uplink to the Nucleus Switching Layer 450 or to switch the cell frame back down to the ANL 250 if the cell is designated for a local Viral Orbital Vehicle connected to it. In the example showed in this Figure involves Viral Orbital Vehicle #1 and Viral Orbital Vehicle #231, the Viral Orbital Vehicle #1 selects the shortest path to get to the destination Viral Orbital Vehicle #231 by going directly its adopted Protonic Switch which sent the cell frames to the hubs ASMs 424 and subsequently to a neighboring Protonic Switch that terminates the connection to the destination Viral Orbital Vehicle.

The second example shown is Viral Orbital Vehicle ID 264 send data to a Viral Orbital Vehicle in a distant city. The cells are switched by the Viral Orbital Vehicle adopted Protonic Switch which read the cell header and determines that the cell must go to the Nucleus Switch 400 in the NSL 450 which switches the cell to the distant city. This arrangement manages the utilization of critical bandwidth and switching resources by not sending cells destined for local connection up to the NSL.

Figure 16:
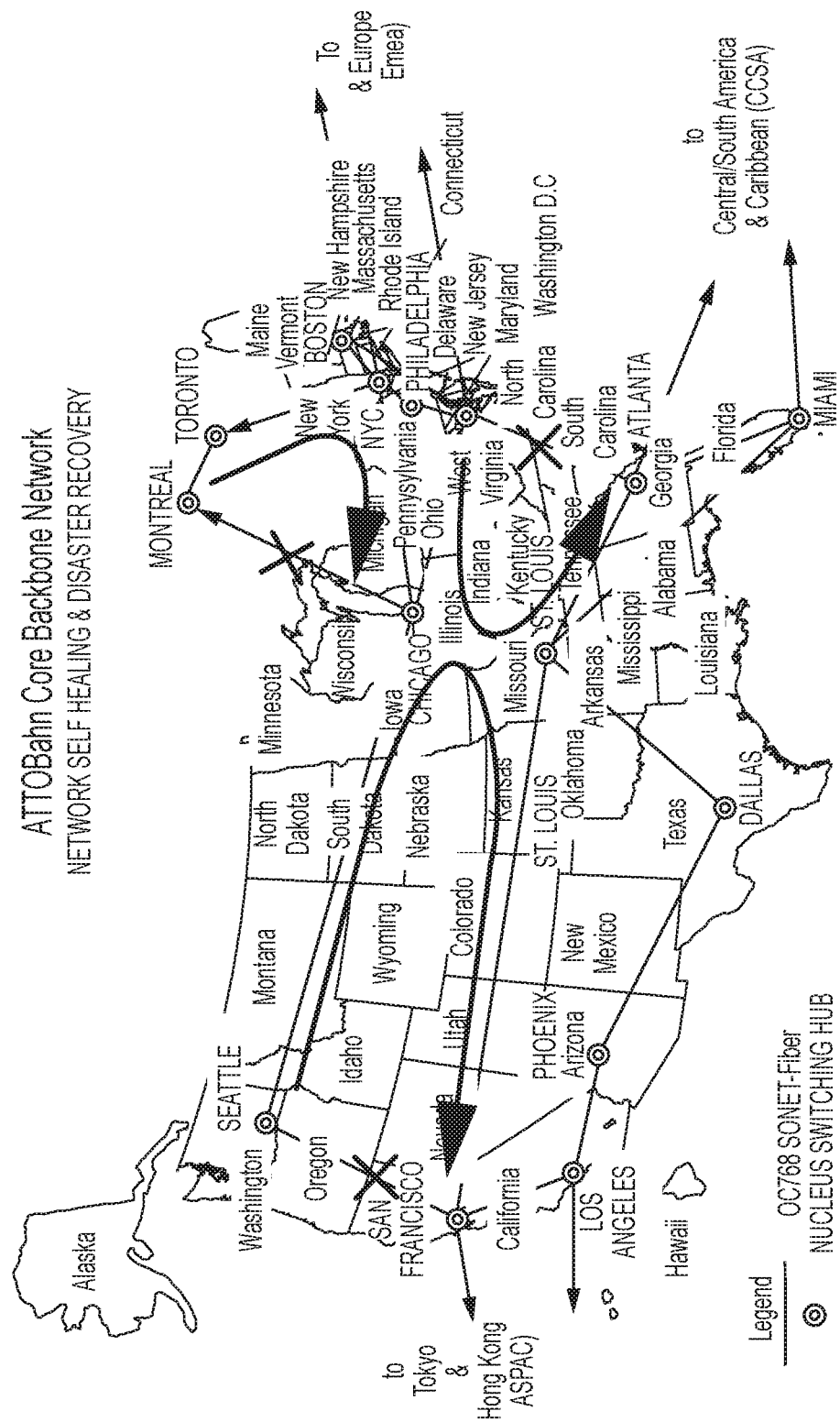
FIG. 16.0 shows the Viral Molecular network North America Core Backbone network which encompasses the use of the Nucleus Switches to provide nationwide communications for the end users which is an embodiment of this invention.

FIG. 16.0 shows the Viral Molecular network North America Core Backbone network which encompasses the use of the Nucleus Switches to provide nationwide communications for the end users which is an embodiment of this invention.

The backbone switches connects the major NFL cities at the high capacity bandwidth tertiary level and the integrate the secondary layer of the core in smaller cities. The International backbone layer connects the major international cities. The network is scaled into major east coast hubs 501 which consists of New York, Washington, D.C., and Miami; major mid-west hubs 502 which consists of Chicago and St. Louis; major west coast hubs 503 which consists of Seattle, San Francisco, and Los Angeles. These major hubs are connected to each other via high capacity fiber optics links 504 operating at multiple 768 Gbps between the Nucleus Switches. These fiber optics links are diverse from each other in term of routes, cable trench, Point-of-Presence (POP) to make sure that the viral molecular network has no common point of failure on the backbone network. This redundancy design works in harmony with the design of the Nucleus Switches cell switching schema so that when a failure occurs on a fiber link or a Nucleus Switch that no city is isolated and thus the users in that city sill have no service. The Nucleus Switch fiber optic failure alarm alert and the cell switch rerouting around the failure is determine by an algorithm that works with the time that the fiber optic terminals takes to switchover to their backup link before the cell switch starts to reroute cells too prematurely so that systems that recovery time is extended. Viral Molecular network Nucleus Switch is designed to work with the fiber optic terminals and switches to coordinate the network failed facilities recovery.

The Viral Molecular North America backbone network as illustrated in FIG. 16.0, initially consists of the following major cities network hubs that are equipped with core Nucleus Switches are Boston, New York, Philadelphia, Washington D.C., Atlanta, Miami, Chicago, St. Louis, Dallas, Phoenix, Los Angeles, San Francisco, Seattle, Montreal, and Toronto. The facilities between these hubs are multiple fiber optic SONET OC-768 circuits terminating on the Nucleus switches. These locations are based on their metropolitan concentration of people; with New York city metro totaling some 19,000,000; Los Angeles having over 13,000,000; Chicago with 9,555,000; Dallas and Houston each with over 6,700,000; Washington D.C., Miami, and Atlanta metros each boasting more than 5,500,000; etc.

Figure 17:
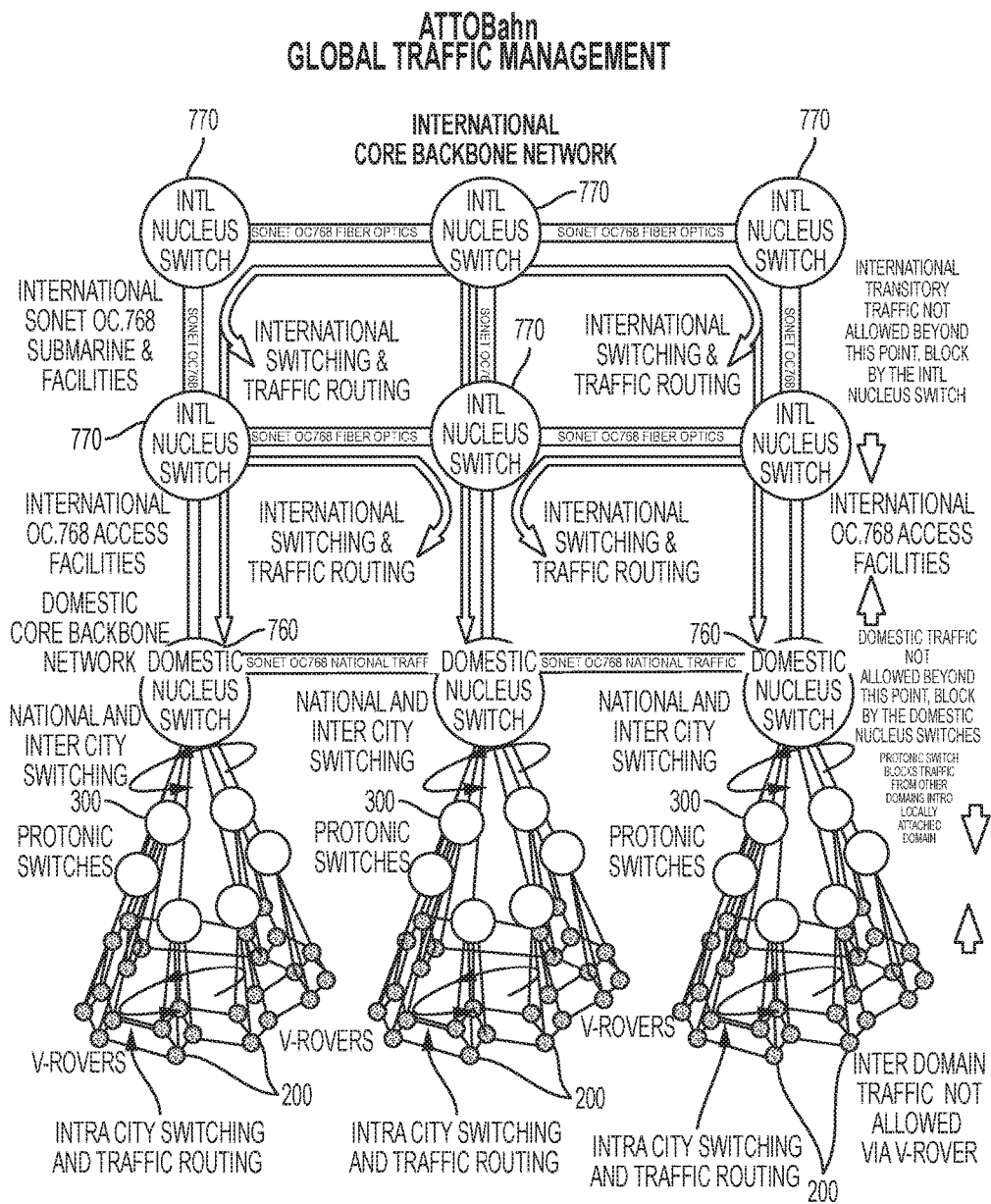
FIG. 17.0 illustrates the Viral Molecular network self-healing and disaster recovery design of the Core North Backbone portion of the network which is key embodiment of this invention.

FIG. 17.0 illustrates the Viral Molecular network self-healing and disaster recovery design of the Core North Backbone portion of the network which is key embodiment of this invention. The network is designed with self-healing rings between the key hubs cities. The rings allow the Nucleus Switches to automatically reroute traffic when a fiber optic facility fails. The switches recognizes the loss of the facility digital signal after a few micro-seconds and immediately goes into service recovery process and switch all of the traffic that was being sent to the failed facility to the other routes and distribute the traffic across those routes depending on their original destination.

For example if multiple OC-768 SONET fiber facilities between San Francisco and Seattle fails, the Nucleus Switches between these two locations immediately recognizes this failed condition and take corrective action. The Seattle switches start rerouting the traffic destined for San Francisco location and transitory traffic through the Chicago and St. Louis switches and back to San Francisco.

The same series of actions and network self-healing processes are initiated when failures occur between Chicago and Montreal, with the switches pumping the recovered traffic destined for Chicago through Toronto and New York and back to Chicago. A similar set of actions will be taken by the switches between Washington D.C. and Atlanta to recover the traffic lost between these two locations by switching them through Chicago and St. Louis. All of these actions are executed instantaneously without the knowledge of end users and without any impact on their services. The speed at which this rerouting takes place at is faster than the end systems can respond to the failure of the fiber facilities.

The natural respond by most end systems such as TCP/IP devices is to retransmit any small amount of loss data and most digital voice and video systems' line buffering will compensate for the momentary loss of data stream.

This self-healing capability of the network keeps its operational performance in the 99.9 percentile. All of these performance and self-correcting activities of the network is captured by the network management system and the Global Network Control Centers (GNCCs) personnel.

Figure 18:
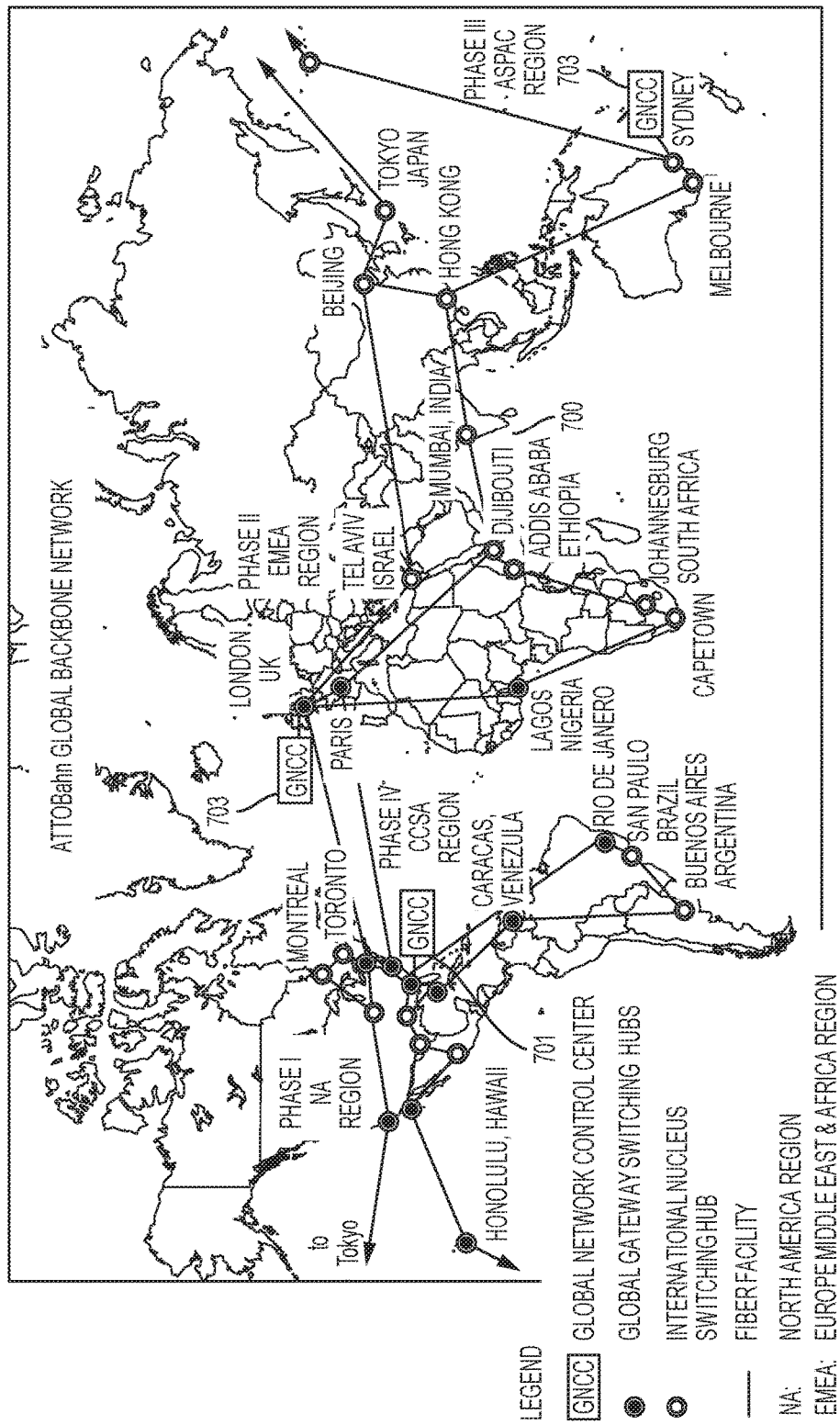
FIG. 18.0 is an illustration of Viral Molecular network global traffic management of the digital streams between its global international gateway hubs utilizing the Nucleus Switches which is an embodiment of this invention.

FIG. 18.0 is an illustration of the Viral Molecular network global traffic management of the digital streams between its global international gateway hubs utilizing the Nucleus Switches which is an embodiment of this invention.

Global Traffic Switching Management

The switches routing and mapping systems are configured to manage the network traffic on a national and international level based on cost factors and bandwidth distribution efficiency. The global core backbone network is divided into molecular domains on a national level which feeds into the tertiary global layer of the network as depicted in FIG. 18.0.

The entire traffic management process on a global scale is self-manage by the switches at the Access Network Layer (ANL), Protonic Switching Layer (PSL), Nucleus Switching Layer (NSL), and the International Switching Layer (ISL).

Access Network Layer Traffic Management

At the ANL 250 level the Viral Orbital Vehicles determine which traffic is transiting its node and switch it to one of its four neighboring Viral Orbital Vehicles 200 depending on the cell frame destination node. At the ANL level, all of the traffic traversing between the Viral Orbital Vehicles are being terminated on one of the Viral Orbital Vehicles in that atomic domain. The Protonic Switch 300 that acts as a gate keeper for the atomic domain that its presides over. Therefore once traffic is moving within the ANL, it is either on its way from its source Viral Orbital Vehicle to its presiding Protonic Switch, that had already adopted it as its primary adopter; or it is being transit toward its destination Viral Orbital Vehicle. Hence all of the traffic in an atomic domain is for that domain in the form of leaving its Viral Orbital Vehicle on its way to the Protonic Switch to go toward the Nucleus Switch 400 and then sent to the Internet, a corporate host, native video or on-net voice/calls, movie download, etc. or being transit to be terminated on one of the Viral Orbital Vehicle in the domain. This traffic management makes sure that traffic for other atomic domains are not using bandwidth and switching resources in another domain, thus achieving bandwidth efficiency within the ANL.

Protonic Switching Layer Traffic Management

The Protonic Switches has the presiding responsibility of managing the traffic in its atomic molecular domain and blocking all traffic destined to another atomic molecular domain from entering its locally attached domain. Also the Protonic Switch has the responsibility of switching all traffic to the hub ASMs. The Protonic Switches read the cell frames header and directs the cells to the ASMs for inter atomic molecular domains traffic; intra city or inter city traffic; national or international traffic. The Protonic Switches do not have to separate the aforementioned traffic groups, instead it simply look for its atomic domain traffic on the outbound and inbound traffic. If the inbound traffic cell frame header does not have its atomic domain header, it blocks it from entering its atomic domain and switch it back to its hub ASM switch. All outbound traffic from the Viral Orbital Vehicles are switched by the Protonic Switch directly to its presiding hub ASM switch. This switching and traffic management design of the Protonic Switches minimizes the amount of switching management that they have to do, thus speeding up switching and reducing traffic latency through the switches.

Nucleus & Hub ASMs Switching/Traffic Management

The domestic hub ASMs and Nucleus Switch 760 directs all traffic from the PSL level to other atomic domains within the molecular domain that it oversee. In addition, the hub ASMs switch the traffic that is destined for other ASMs' molecular domains or send the traffic to the Nucleus Switches. Therefore the hub ASMs manage all intra city traffic between molecular domains.

These ASMs block all local traffic from entering the Nucleus Switch and the national network. The ASMs and Nucleus Switch international hubs 770 read the cell frames headers to determine the destination of the traffic and switch all traffic destined for another city or internationally to the Nucleus Switch. This arrangement keeps all local traffic from entering the national or international core backbone.

The Nucleus Switches are strategically located at the major cities around the world. These switches are responsible for managing traffic between the cities within a national network. The switches read the cell frames headers and route the traffic to the peers in within the national networks and between the International Switches. These switches insure that domestic traffic are kept out of the international core backbone which eliminate national traffic from using expensive international facilities, reduces network latency, increase bandwidth utilization efficiency.

Figure 19:
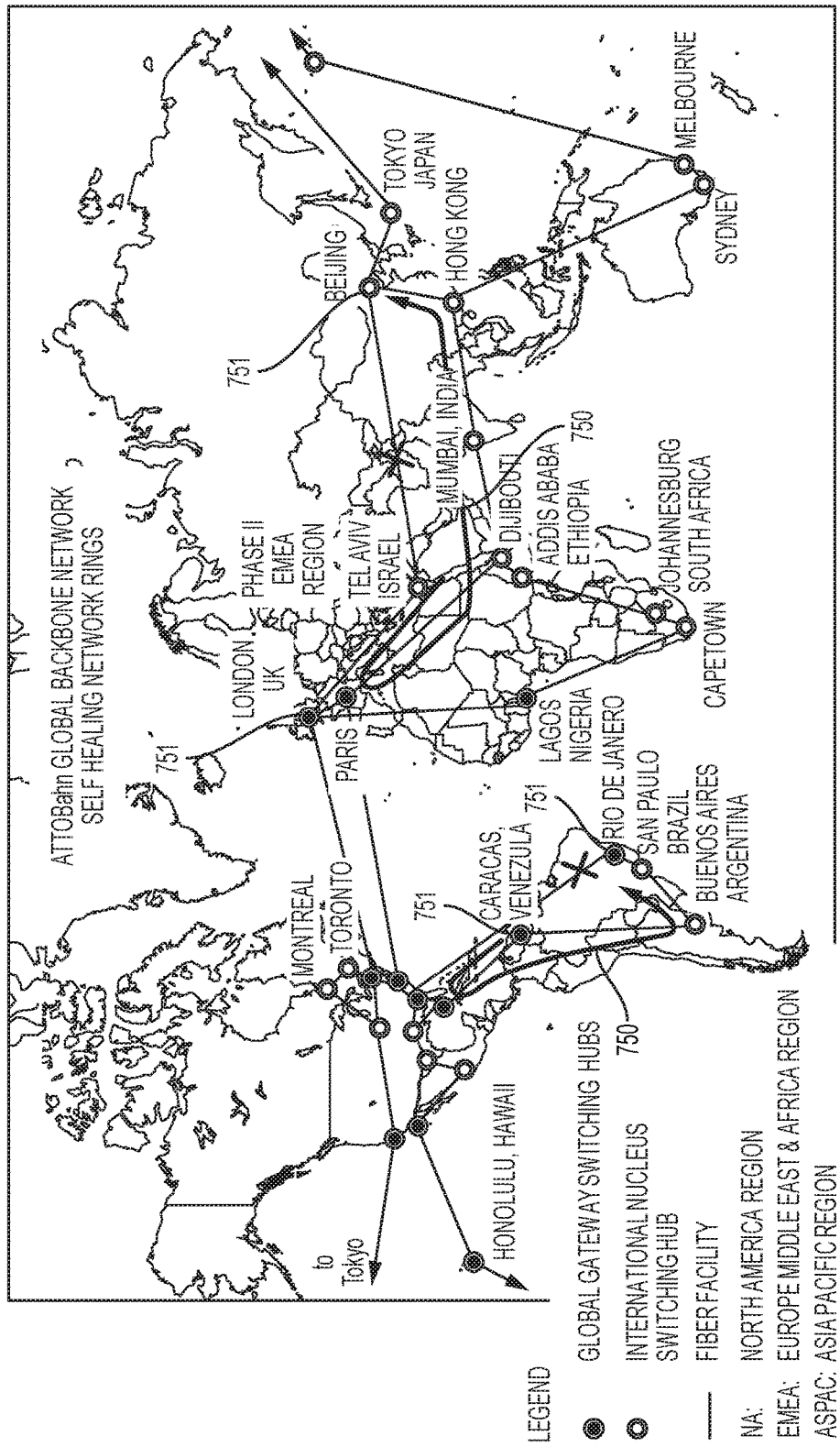
FIG. 19.0 is a depiction of the Viral Molecular network global core backbone international portion of the network connecting key countries Nucleus Switching hubs to provide viral molecular network customers with international connectivity which is key part of this invention.

FIG. 19.0 is a depiction of the Viral Molecular network global core backbone international portion 600 of the network connecting key countries Nucleus Switching hubs to provide the viral molecular network customers with international connectivity which is key part of this invention.

The International Switches preside over the traffic passed to it from the national networks destined to other countries as shown in FIG. 19.0. These switches only focus on cells that the national switches pass to them and do not get involved with national traffic distribution. International Switches examines the cell frames headers and determines which country the cells are destined and switch them to correct international node and associated Sonet facility.

Several International Switches function as global gateway switches that interface each of the four global regions: The global gateway switches 601 in the US in San Francisco and Los Angeles function as the North America (NA) regional hubs connecting t\he ASPAC region 602 at Sydney, Australia and Tokyo, Japan. The four gateway switches on the East Coast of the United States of America in New York and Washington D.C. connect the Europe Middle East & Africa (EMEA) Europe gateways 603 in London, United Kingdom and Paris, France. The two gateway nodes in Atlanta and Miami connects the gateway nodes in Caribbean, Central & South America (CCSA) region 604 at the cities of Rio De Janero, Brazil and Caracas, Venezuela.

The gateway nodes in Paris connects to the gateway nodes in Lagos, Nigeria and Djibouti City, Djibouti in Africa. The London City will node connects the western part of Asia in Tel Aviv, Israel. This design provides an hierarchical configuration that isolates traffic to various regions. For example, the gateway node in Djibouti City and Lagos reads the cell frames of all of the traffic coming into and leaving Africa and only allow traffic terminating on the continent to pass through. Also these switches only allow traffic that are destined for another region to leave the continent. These switches blocks all intra continental traffic from passing to the other regions' gateway switches. This capability of these switches manage the continental traffic and transiting traffic for other regions.

Figure 20:
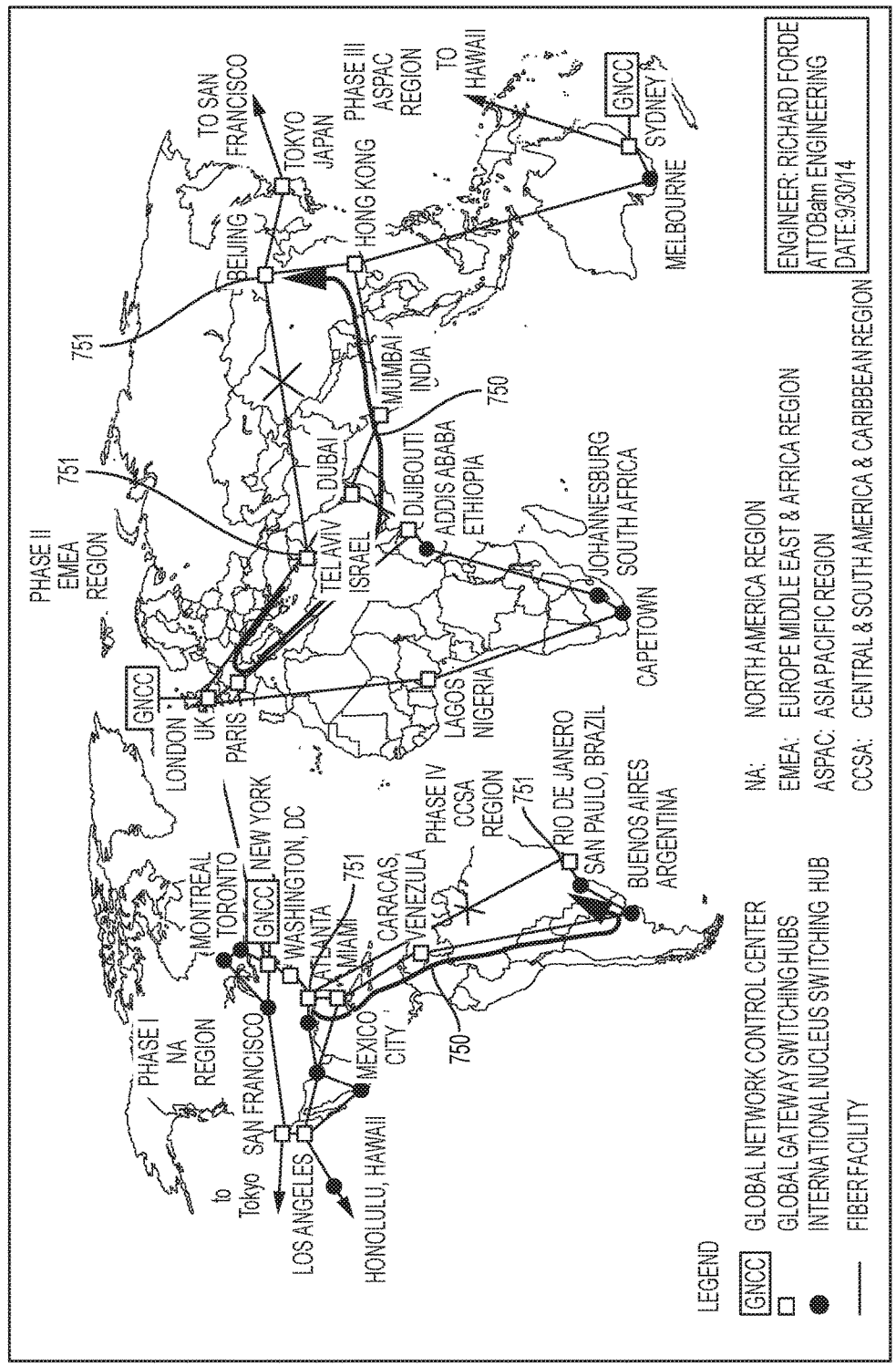
FIG. 20.0 displays the Viral Molecular network self-healing and dynamic disaster recovery of the global core backbone international portion of this network which is an embodiment of this invention.

FIG. 20.0 displays the Viral Molecular network self-healing and dynamic disaster recovery of the global core backbone international portion of this network which is an embodiment of this invention. The global core network as depicted in FIG. 20.0 is designed with self-healing rings 760 connecting the global gateway switches. The first ring is formed between New York, Washington D.C., London and Paris. The second ring is between Atlanta, Miami, Caracas, and Rio De Janero. The third ring is between London, Paris, Johannesburg, and Cape Town. The fourth ring is between London, Beijing, Paris, and Hong Kong. The fifth ring is between Beijing, San Francisco, Los Angeles, and Sydney. These rings are design in such a manner that if one of the Sonet facilities fails, then the gateway switches in that ring will immediately go into action of rerouting the traffic around the failure as shown in FIG. 19.0.

The gateway switches are so configured that if the Sonet facility fails in ring number two between Atlanta and Rio De Janero, the switches immediately recognize the problem and start to reroute the traffic that was using this path through the switches and facilities in Atlanta, Caracas, San Paulo and then to its original destination in Rio De Janero. The same scenario is show on ring number four after a failure between Israel and Beijing. The switches between the two facilities reroute the traffic around the failed facility from Tel Aviv to London then through Paris, Djibouti City, India, Hong Kong, and to Beijing. All of this is carried out between the switches in micro seconds. The speed of healing these failed rings result in minimal loss of data and in most cases will not even be notice by the end users and their systems. All of the rings between the gateway nodes are self-healing, thus making the network very robust in term of recovery and performance.

Global Network Control Centers

FIG. 19.0 depicts the Global Network Control Centers 700 in North America, ASPAC (Asia Pacific), and EMEA (Europe Middle-East, and Africa) which is an embodiment to the invention. The Viral Molecular Network is controlled by three Global Network Control Centers (GNCCs) as shown in FIG. 19.0. The GNCCs manage the network on an and-to-and basis by monitoring all of the International, Nucleus, ASMs, and Protonic switches. Also the GNCCs monitor the Viral Orbital Vehicles. The monitoring process consists of receiving the system status of all network devices and systems across the global. All of the monitoring and performance reporting is carried out in real time. At any moment the GNCCs can instantaneously determine the status of any one of the aforementioned network switches and system.

The three GNCCs are strategically located in Sydney 703, London 702, and New York 701. These GNCCs will operate 24 hours per day 7 days per week (24/7) with the controlling GNCC following the sun, The controlling GNCC starts with the first GNCC in the East, being Sydney and as the Earth turns with the Sun covering the Earth from Sydney to London to New York. This means that while the UK and United States are sleeping at nights (minimal staff), Sydney GNCC will be in charge with its full complement of day-shift staff. When Australia business day comes to end and their go on minimal staff, then following the Sun, London will now be up and running at full staff and take over the primary control of the network. This process is later followed by New York taking control as London staff winds down the business day. This network management process is called follow the sun and is very effective in management of large scale global network.

The GNCC will be co-located with the Global Gateway hubs and will be equipped with various network management tools such as the Viral Orbital Vehicles, Protonic, ASMs, Nucleus, and International switching NMSs (Network Management Systems). The GNCCs will each have a Manager of Manager network management tool called a MOM. The MOM consolidates and integrates all of the alarms and performance information that are received from the various networking systems in the network and present them in a logical and orderly manner. The MOM will present all alarms and performance issues as root cause analysis so that technical operations staff can quickly isolate the problem and restore any failed service. Also with the MOM comprehensive real-time reporting system, the viral molecular network operations staff will be proactive in managing the network.

In one embodiment, a wireless communication device for a high speed, high capacity dedicated mobile network system comprises a housing having at least one USB port for receiving an information stream from an end user application; at least one integrated circuit chip connected inside the housing; a port for receiving an information stream from a wireless local area network; at least one clock; an attosecond multiplexer[; a local oscillator; at least one phase lock loop; at least one orbital time slot; and at least one RF unit having a 16-phase Phase Shift Key modulator; wherein the integrated circuit chip converts the information stream from the at least one port into at least one fixed cell frame; wherein the at least one fixed cell frame is processed by the attosecond multiplexer and delivered to the at least one orbital time slot for delivery as an ultra-high digital data stream to a terminating network; and wherein the wireless communication device creates the high speed, high capacity dedicated molecular network with at least one other wireless communication device. The wireless communication device of claim 1, wherein the at least one port accepts high speed data streams from a group comprising host packets, TCP/IP packets, Voice Over IP packets, Video IP packets, graphic packets, MAC frames and data packets. The at least one port transmits undedicated raw data from host packets, TCP/IP packets, Voice Over IP packets, Video IP packets, graphic packets, MAC frames and data packets as the at least one fixed cell frame to the terminating network. The integrated circuit chip constantly reads a header for the at least one fixed cell frame for its port designation address by a connectionless protocol. The fixed cell frame is between from about 50 bytes to about 70 bytes.

In one embodiment The high speed, high capacity dedicated molecular network comprises an Access Network Layer (ANL); a Protonic Switching Layer (PSL); a Nucleus Switching Layer (NSL); wherein the ANL includes the at least one wireless communication device that transmits and receives an information stream to the at least one fixed sized cell frame which is wirelessly transmitted and received in the at least one orbital time slots of wireless information streams in the PSL. The PSL includes at least one Protonic Switch for communication with the at least one orbital time slot of an information stream from the internet, cable, telephone, and private networks to transmit and receive the at least one fixed size cell frame to and from the at least one port of additional wireless communication devices via the NSL; and wherein the NSL includes at least one nucleus switch positioned at fixed locations to create a primary interface between the PSL and the internet, telephone, cable and private networks.

In one embodiment, a high speed, high capacity dedicated mobile network system, comprising: an Access Network Layer (ANL); a Protonic Switching Layer (PSL); a Nucleus Switching Layer (NSL); wherein the ANL includes at least one wireless communication device comprising a housing having at least one USB port for receiving an information stream from an end user application, at least one integrated circuit chip connected inside the housing, a port for receiving an information stream from a wireless local area network, at least one clock, an attosecond multiplexer, a local oscillator, at least one phase lock loop, at least one orbital time slot, and at least one RF unit having a 16-phase Phase Shift Key modulator; wherein the PSL includes at least one Protonic Switch for communication with the at least one orbital time slot of an information stream from the internet, cable, telephone, and private networks to transmit and receive the at least one fixed size cell frame to and from the at least one port of additional wireless communication devices via the NSL; and wherein the NSL includes at least one nucleus switch positioned at fixed locations to create a primary interface between the PSL and the internet, telephone, cable and private networks.

A plurality of attosecond Multiplexer, which are interconnected to each other and the to the at least one nucleus switch, wherein each attosecond multiplexer is wirelessly coupled to the PSL, and acts as an intermediary between the PSL, other attosecond multiplexers and the at least one nucleus switch.

In one embodiment, a method of transmitting an information stream over a high speed, high capacity mobile network system, comprising the steps of: Receiving an information stream from an Access Network Layer (ANL) to a wireless communication device comprising a housing having at least one port for receiving an information stream from an end user application, at least one integrated circuit chip connected inside the housing, a port for receiving an information stream from a wireless local area network, at least one clock, an attosecond multiplexer, a local oscillator, at least one phase lock loop, at least one orbital time slot, and at least one RF unit having a 16-phase Phase Shift Key modulator; converting the information stream from the at least one port into at least one fixed cell frame by the integrated circuit chip; transmitting the at least one fixed cell frame of the information stream to the at least one orbital time slot from the at least one port of additional wireless communication devices via the Protonic Switching Layer (PSL); and receiving of the at least one fixed cell frame of the information stream by at least one nucleus switch positioned at fixed locations to create a primary interface Nucleus Switching layer (NSL) between the PSL and the internet, telephone, cable and private networks of an end user.

It will be apparent to those skilled in the art that various changes may be made in the disclosure without departing from the spirit and scope thereof, and therefore, the disclosure encompasses embodiments in addition to those specifically disclosed in the specification, but only as indicated in the appended claims.

The invention claimed is:

1. A wireless communication device for a national and international mobile wireless network system, wherein the communication device creates a high speed, high capacity dedicated molecular network with at least one other communication device, the device comprising:
   a synchronous cell framing switch for encapsulating a customer information stream received by the communication device into at least one fixed cell frame consisting of 67 bytes;
   an atto-second multiplexer for processing the at least one fixed cell frame; and
   a data bus for delivering the at least one fixed cell frame to at least one orbital time slot, the orbital time slot transmitting the at least one fixed cell frame to various networks at up to terabits per second speed;
   wherein the wireless communication device operates in a frequency band in the order of 200 to 3,300 gigahertz.

2. The wireless communication device of claim 1 being installed in an automobile and an aerial drone.

3. The wireless communication device of claim 1, further comprising an integrated circuit chip that contains the cell framing switch, an attosecond multiplexer, a modem, an oscillator, a phase lock loop, and a millimeter wave radio frequency circuit.

4. A method of transmitting an information stream over a mobile wireless network using a wireless communication device, the method comprising:
   receiving an information stream from a customer system;
   converting the information stream into at least one fixed cell frame consisting of 67 bytes by an integrated circuit chip;
   multiplexing the at least one fixed cell frames and placing the at least one fixed cell frames synchronously into time slots; and
   transmitting the multiplexed fixed cell frames to various networks at up to terabits per second speed;
   wherein the wireless communication device operates in a frequency band in the order of 200 to 3,300 gigahertz.

5. The wireless communication device of claim 1, further comprising:
   a housing having at least one port for receiving an information stream;
   at least one integrated circuit chip located within the housing, the integrated circuit chip comprising:
      at least one framing cell configured to encapsulate customer information streams;
      at least one multiplexer configured to place the cell frames into time slots;
      at least one orbital time slot comprising high speed digital time divisions;
      at least one local oscillator configured to control the at least one local oscillator;
      at least one phase lock loop configured to control the at least one local oscillator;

at least one high speed bus configured to move data between circuits in the wireless communication device, wherein the wireless communication device operates in a frequency band in the order of 200 to 3,300 gigahertz;

a high frequency antenna coupled to the housing and configured to transmit and receive electromagnetic signals in the range of 200 to 3,300 Ghz;

a low frequency antenna coupled to the housing and configured to transmit and receive electromagnetic signals; and a CPU configured to serve network management circuitry of the wireless communication device and various end user services.

6. The wireless communication device of claim 5, wherein the multiplexer is an atto-second multiplexer.

7. The wireless communication device of claim 5, wherein the integrated circuit chip places at least one cell frame onto a high speed switching bus, the cell frame encapsulating the customers digital stream information.

8. The wireless communication device of claim 1, wherein the atto-second multiplexer uses the integrated circuit chip to place network management information streams into the cell frames and the orbital time slot.

* * * * *